(12) United States Patent
Baba et al.

(10) Patent No.: US 7,617,411 B2
(45) Date of Patent: Nov. 10, 2009

(54) CLUSTER SYSTEM AND FAILOVER METHOD FOR CLUSTER SYSTEM

(75) Inventors: Tsunehiko Baba, Hachioji (JP); Yuji Tsushima, Hachioji (JP); Toshiomi Moriki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 430 days.

(21) Appl. No.: 11/707,876

(22) Filed: Feb. 20, 2007

(65) Prior Publication Data
US 2008/0162983 A1 Jul. 3, 2008

(30) Foreign Application Priority Data
Dec. 28, 2006 (JP) .............................. 2006-356576

(51) Int. Cl.
*G06F 11/00* (2006.01)
(52) U.S. Cl. ............................................ 714/4; 714/11
(58) Field of Classification Search ................ 714/3, 714/4, 11, 13
See application file for complete search history.

(56) References Cited

U.S. PATENT DOCUMENTS

| | | | |
|---|---|---|---|
| 6,728,896 B1* | 4/2004 | Forbes et al. ................... | 714/4 |
| 2002/0162049 A1* | 10/2002 | Takamoto et al. .............. | 714/12 |
| 2004/0255183 A1* | 12/2004 | Takahashi ....................... | 714/3 |
| 2006/0085668 A1* | 4/2006 | Garrett ........................... | 714/4 |
| 2006/0195715 A1* | 8/2006 | Herington ....................... | 714/4 |
| 2008/0126834 A1* | 5/2008 | Sankaran et al. ............... | 714/4 |
| 2008/0263390 A1* | 10/2008 | Baba et al. ...................... | 714/4 |
| 2008/0270825 A1* | 10/2008 | Goodson et al. ................ | 714/6 |
| 2009/0119538 A1* | 5/2009 | Scales et al. .................... | 714/6 |
| 2009/0138752 A1* | 5/2009 | Graham et al. ................. | 714/4 |

* cited by examiner

*Primary Examiner*—Marc Duncan
(74) *Attorney, Agent, or Firm*—Stites & Harbison PLLC; Juan Carlos A. Marquez, Esq.

(57) ABSTRACT

Provided is a failover method for a cluster system for realizing smooth failover of the guest OS's, even when there are many guest OS's, while reducing consumption of computer resources of a server. Smooth failover is realized by preventing competition during failover even when the number of guest OS's is increased. In a cluster configuration in which a slave/master cluster program is operated in a guest OS/host OS, the master cluster program (510) collects and transmits heartbeats of the slave cluster program, thereby realizing failure monitoring through the certain amount of heartbeats without depending on the number of guest OS's. Further, when the master cluster program monitors failures of the slave cluster program of its own computer to find a normal operation of the guest OS, the amount of communication through heartbeats is reduced by eliminating the necessity of communication to a standby system slave cluster program.

15 Claims, 31 Drawing Sheets

| APPLICATION IDENTIFIER | TARGET OS 1 | | TARGET OS 2 | |
|---|---|---|---|---|
| | HOST OS IDENTIFIER | GUEST OS IDENTIFIER | HOST OS IDENTIFIER | GUEST OS IDENTIFIER |
| AP1 | HOST OS A | GUEST OS 1 | HOST OS B | GUEST OS 3 |
| AP2 | HOST OS A | GUEST OS 2 | HOST OS C | GUEST OS 4 |

*FIG. 4*

| HOST OS IDENTIFIER ⤴2001 | GUEST OS IDENTIFIER ⤴2002 | | | HOST OS STATE ⤴2003 | HOST OS STATE UPDATE TIME ⤴2004 |
|---|---|---|---|---|---|
| HOST OS A | GUEST OS 1 | GUEST OS 2 | | OK(TIME t1) | TIME t1 |
| HOST OS B | GUEST OS 3 | GUEST OS 4 | | OK(TIME t2) | TIME t2 |

*FIG. 5*

| GUEST OS IDENTIFIER ~3001 | GUEST OS STATE ~3002 | GUEST OS STATE UPDATE TIME ~3003 |
|---|---|---|
| GUEST OS 1 | OK | TIME t3 |
| GUEST OS 2 | OK | TIME t4 |

FIG. 6

| APPLICATION IDENTIFIER ~4001 | SYSTEM STATE ~4002 | HOST OS IDENTIFIER ~4003 | GUEST OS IDENTIFIER ~4004 | AP OPERATION STATE ~4005 | AP OPERATION STATE UPDATE TIME ~4006 |
|---|---|---|---|---|---|
| AP1 | ONL | HOST OS A | GUEST OS 1 | Status NG | TIME t5 |
|  | SBY | HOST OS B | GUEST OS 3 | Status OK | TIME t6 |
| AP2 | ONL | HOST OS A | GUEST OS 2 | Status OK | TIME t7 |
|  | SBY | HOST OS B | GUEST OS 4 | Status OK | TIME t8 |

*FIG. 12*

| | | |
|---|---|---|
| 5001 | HOST OS IDENTIFIER | HOST OS A |
| 5002 | HOST OS STATE | ONL |
| 5003 | UPDATE TIME OF HOST OS STATE | TIME t1 |
| 5101 | GUEST OS IDENTIFIER | GUEST OS 1 |
| 5102 | GUEST OS STATE | OK |
| 5103 | UPDATE TIME OF GUEST OS STATE | TIME t3 |
| 5111 | AP IDENTIFIER | AP1 |
| 5112 | AP OPERATION STATE | Status OK |
| 5113 | UPDATE TIME OF AP STATE | TIME t5 |
| 5201 | GUEST OS IDENTIFIER | GUEST OS 2 |
| 5202 | GUEST OS STATE | NG |
| 5203 | UPDATE TIME OF GUEST OS STATE | TIME t4 |
| 5211 | AP IDENTIFIER | AP2 |
| 5212 | AP OPERATION STATE | Status NG |
| 5213 | UPDATE TIME OF AP OPERATION STATE | TIME t6 |

*FIG. 15*

| | |
|---|---|
| 6001 — HOST OS IDENTIFIER | HOST OS A |
| 6002 — HOST OS STATE | ONL |
| 6003 — HOST OS STATE UPDATE TIME | TIME t1 |
| 6101 — FAILED GUEST OS IDENTIFIER | GUEST OS 2 |
| 6103 — GUEST OS STATE UPDATE TIME | TIME t4 |
| 6111 — FAILED AP IDENTIFIER | AP2 |
| 6112 — AP OPERATION STATE | Status NG |
| 6113 — AP OPERATION STATE UPDATE TIME | TIME t6 |

*FIG. 19*

| GUEST OS IDENTIFIER 8001 | ALLOCATION LIMIT FLAG 8002 |
|---|---|
| GUEST OS 3 | ALLOCATION LIMITED |
| GUEST OS 4 | NO LIMIT |

FIG. 25

CLUSTER SYSTEM AND FAILOVER METHOD FOR CLUSTER SYSTEM

CLAIM OF PRIORITY

The present application claims priority from Japanese application P 2006-356576 filed on Dec. 28, 2006, the content of which is hereby incorporated by reference into this application.

BACKGROUND OF THE INVENTION

This invention relates to a highly available computer system which constitutes a cluster configuration in a server virtualization environment, and more particularly to a program which has a function of monitoring failures and executing failover.

Server virtualization is a technology of simultaneously operating a plurality of operating systems (hereinafter, referred to as OS) in a single physical computer. Logical partitioning is realized via a management program (server virtualization program) for dividing resources of the physical computer into a plurality of logical partitions (LPAR), and one OS (guest OS) is operated in each LPAR. The server virtualization program is a program operated in a server virtualization layer (hereinafter, referred to as host OS) such as a hypervisor or an OS different from the guest OS in the physical computer.

In the physical computer (server virtualization environment) which uses such logical partitioning, because the resources of the physical computer are shared by the plurality of LPAR's, there is a possibility that failures will occur in the plurality of LPAR's when the resources of the physical computer fail.

Thus, in the case of constructing a highly available computer system in the server virtualization environment, a cluster configuration computer system which turns over (fails over) an application program (hereinafter, referred to as AP) operated in the guest OS when a failure occurs to another standby system guest OS is used.

In "VMware Server Integral Solution Employing CLUSTERPRO", online, issued by NEC Corporation, retrieved Oct. 31, 2006, Internet URL: http://www.ace.comp.nec.co.jp/CLUSTERPRO/doc/pp_lin/CLUSTERPRO_VMware.pdf (hereinafter, referred to as Non-patent Document 1), the following cluster configuration methods are realized in the server virtualization environment: a method 1 for operating a cluster program in a guest OS of each LPAR to monitor failures of the guest OS and AP between the guest OS's and to execute AP failover; and a method 2 for operating a cluster program in a host OS to monitor failures of the host OS and the guest OS between the host OS's and to execute guest OS failover.

SUMMARY OF THE INVENTION

According to the method 1, by monitoring failures of the guest OS and the AP through communication (heartbeat), the cluster program between the guest OS's executes failover to a standby system when a failure occurs in an active system in which the AP is operated. According to this failover method, it is possible to realize hot standby in which the guest OS or the AP serving as a standby system is started beforehand.

According to the method 2, by monitoring failures of the host OS and the guest OS through heartbeats, the cluster program of the host OS boots the guest OS to fail over a standby system of a failover destination to the same computer or another computer when a failure occurs in the active system. According to this failover method, it is possible to realize cold standby executed from starting the guest OS.

According to the method 1 of the Non-patent Document 1, failure monitoring communication (heartbeat) must be carried out by an amount equal to the number of guest OS's because the cluster program of each guest OS monitors failures of the application and the guest OS. When the number of guest OS's is increased, a high load is applied on a common resource such as a network interface card (NIC) shared by the plurality of guest OS's. Thus, there is a first problem that heartbeats are delayed.

In addition, the cluster program must be operated in each guest OS. Thus, the cluster program in the standby system guest OS becomes idle in other than failure monitoring processing, thereby causing a second problem that utilization efficiency of the computer resources is reduced to lower performance of the active system.

According to the method 2 of the Non-patent Document 1, the first and second problems can be solved. However, it is not a hot standby failover method but a cold standby failover method accompanied by allocation of a guest OS and an application to a new LPAR and booting of the guest OS. Thus, there is a third problem that failover time is extended as compared with the hot standby failover method.

When the methods 1 and 2 are combined, failover processings are independently performed in the methods 1 and 2. Thus, failovers are carried out to different LPAR's, thereby creating a possibility that a plurality of active system LPAR's will simultaneously take over the application. There is a problem that, when such failover competition occurs, data may be destroyed by the plurality of active systems leading generation of system stoppage.

As described above, in the failover method of realizing the hot standby system, when the number of guest OS's is increased, there are problems of an increase in consumption amount of computer resources, delayed heartbeats, and lowered performance of the active system.

This invention has been developed with the aforementioned problems, and it is an object of this invention to realize smooth failover while suppressing consumption of computer resources of a server even when there are many guest OS's.

This invention relates to a failover method for a cluster system, the cluster system including:

first and second virtualization units operated in at least one physical computer;

a first system including a guest OS operated in the first virtualization unit and an application operated in the guest OS;

a second system including a guest OS operated in the second virtualization unit and an application operated in the guest OS; and a third system capable of starting a new operation when the first system is switched in the second virtualization unit, in which the cluster system for failing over one of the guest OS and the application between the first system and one of the second system and the third system executes:

a first cluster processing operated in each guest OS of monitoring the application in the guest OS and failing over the application between the first system and the second system when a failure occurs; and a second cluster processing operated in each virtualization unit of monitoring the guest OS operated in the virtualization unit and the other virtualization unit, migrating the guest OS and the application to the third system when a failure occurs, and starting the guest OS and the application to be failed over between the first system and the third system, the failover method for the cluster system including the steps of:

obtaining information of an application of a guest OS for executing the first cluster processing in the first cluster processing;

notifying the obtained information of the application to the second cluster processing in the first cluster processing of the first system;

obtaining the information of the application from the first cluster processing in the second cluster processing of the first virtualization unit;

collecting the pieces of information of the application obtained from the first cluster processing of the guest OS's in the second cluster processing of the first virtualization unit;

notifying the collected pieces of information of the application en bloc to the second cluster processing of the second virtualization unit in the second cluster processing of the first virtualization unit;

obtaining the pieces of information of the application as heartbeats to transfer the information to the first cluster processing of the guest OS of the second system corresponding to the application in the second cluster processing of the second virtualization unit; and monitoring a failure of the application of the first system based on the information of the application transferred from the second cluster processing, and failing over the application from the first system to the second system when the failure is detected in the first cluster processing of the second virtualization unit.

Further, the failover method for the cluster system further includes the steps of:

notifying the collected pieces of information of the application en bloc to the second cluster processing of the second virtualization unit in the second cluster processing of the first virtualization unit;

obtaining a state of the guest OS of the first system in the second cluster processing of the first virtualization unit; and notifying the obtained state of the guest OS and the obtained failed state of the application en bloc to the second cluster processing of the second virtualization unit.

Further, the failover method for the cluster system further includes the steps of:

starting the application to stand by in the first cluster processing of the second system;

notifying the standby state of the application to the second cluster management unit of the second virtualization unit in the first cluster processing of the second system;

reducing resources allocated to a guest OS in which the application has been set to stand by to realize the standby state based on the notification in the second cluster processing of the second virtualization unit; and increasing the resources allocated to a guest OS in which the application has been set to stand by to perform failover when the state of the failure of the application is obtained in the second cluster processing of the second virtualization unit.

Thus, in the cluster configuration of the server virtualization environment, by operating the first and second cluster management units (slave cluster program and master cluster program) in the guest OS/host OS (virtualization unit), and collecting and transmitting the heartbeats of the slave cluster program via the master cluster program, it is possible to provide a function of realizing failure monitoring based on the certain amount of heartbeats without depending on the number of guest OS's.

By monitoring failures of the slave cluster program via the master cluster program, communication to the standby system (second system) slave cluster program is made unnecessary when the guest OS is normally operated. Thus, it is possible to provide a function of reducing heartbeats without depending on the number of guest OS's. It is also possible to realize smooth failover by preventing competition during failover even when the number of guest OS's is increased.

Additionally, the master cluster program stops the allocation of the computer resources to the standby system guest OS. It is possible to perform failover by resuming allocation of the computer resources to the guest OS of the failover destination when a failure occurs in the active system guest OS.

Further, the master cluster program reduces the allocation amount of computer resources to the standby system guest OS. It is possible to provide a function of performing failover by releasing the reduction of the allocation amount of computer resources when a failure occurs in the active system guest OS.

As described above, in the cluster configuration of the server virtualization environment, i.e., in the cluster configuration in which the slave/maser cluster program is operated in the guest OS/host OS, it is possible to provide a failover method capable of monitoring failures without delaying monitoring of the heartbeats even when the number of guest OS's is increased.

BRIEF DESCRIPTION OF THE DRAWINGS

FIG. 4 is a configuration diagram of a guest OS failover correspondence table according to the first embodiment.

FIG. 5 is a configuration diagram of a host OS state management table according to the first embodiment.

FIG. 6 is a configuration diagram of a guest OS state management table according to the first embodiment.

FIG. 12 is a configuration diagram of an application state management table according to the third embodiment.

FIG. 15 is a configuration diagram showing detailed heartbeats of an active system host OS including a host OS state and a guest OS state according to the third embodiment.

FIG. 19 is a configuration diagram showing an example of collected heartbeats including a host OS state, a guest OS state, and an application state according to the fifth embodiment.

FIG. 25 is a configuration diagram showing a CPU allocation table according to the seventh embodiment.

DETAILED DESCRIPTION OF THE PREFERRED EMBODIMENTS

The preferred embodiments of this invention will be described referring to the accompanying drawings.

First Embodiment

It should be noted that drawings and description of this invention are simplified to show proper elements for clearly understanding this invention, and well-known elements and the like are omitted as long as it does not hinder implementation of this invention. In the technology of this invention, there are some other elements of the conventional art desired and/or necessary for implementing this invention. However, as those elements of the conventional art are well-known, and are not necessary for facilitating understanding of this invention, they will not be explained. In the description below, programs may be described based on module numbers of an active system (or current system), but the description thereof may also serves as description of corresponding programs in a standby system. Further, in reference symbols shown below, some may use symbols identical to those shown in the other drawings, and denote similar components unless specified otherwise.

FIGS. 1 to 9 show a first embodiment of this invention.

Figure 1:
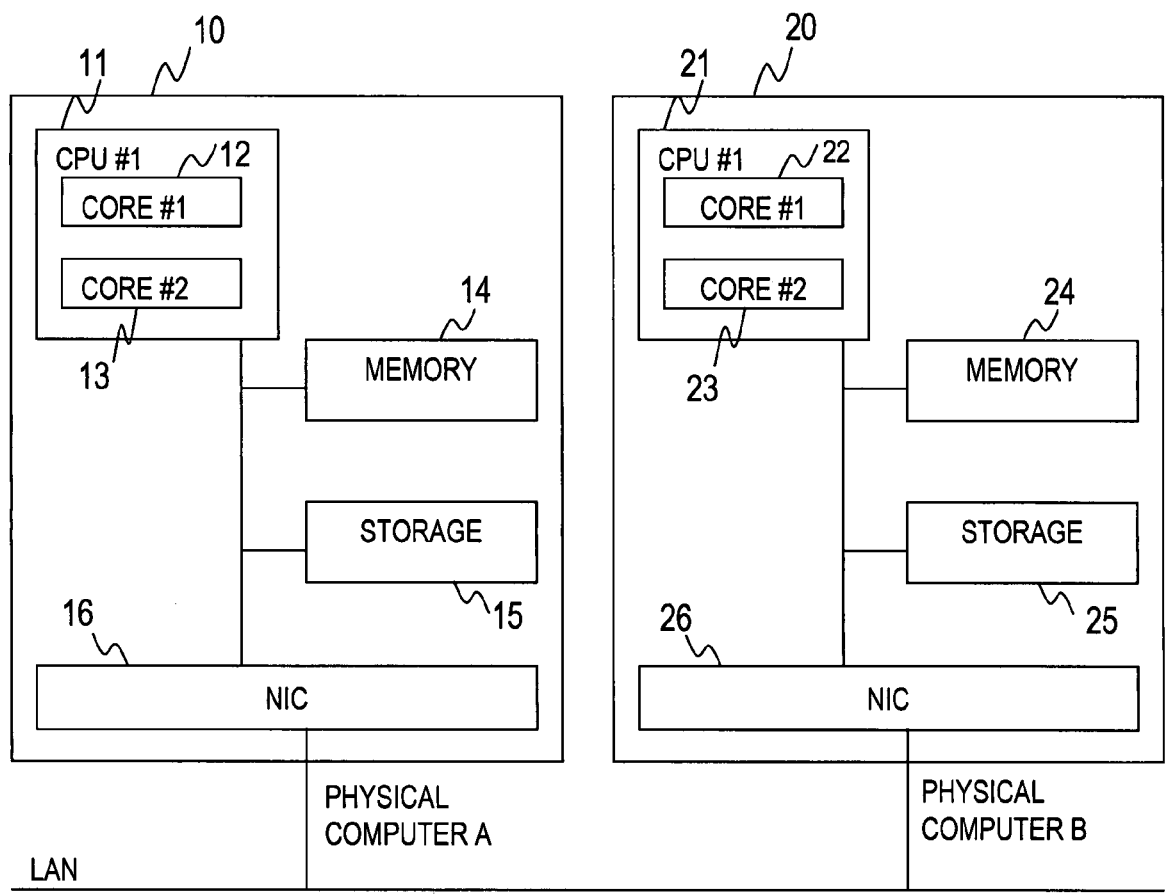
FIG. 1 is a block diagram showing a hardware configuration of physical computers according to a first embodiment.

FIG. 1 is a block diagram showing a hardware configuration of physical computers in a server virtualization environment according to the first embodiment.

A physical computer "A" of the first embodiment includes a CPU 11, a memory 14, a storage 15, and a network interface card (NIC) 16.

The CPU 11 performs various processings by executing programs stored in the memory 14. The memory 14 and the storage 15 store the programs executed by the CPU 11 and data necessary for processing. The NIC 16 communicates with the other computer (e.g., physical computer "B") via a network (LAN in the drawing). The CPU 11 includes a plurality of cores #1 and #2, and can execute a plurality of processings (e.g., a plurality of OS's) in parallel.

The physical computer B is configured as in the case of the physical computer A, and includes a CPU 21, a memory 24, a storage 25, and a NIC 26. The CPU 21 performs various processing by executing programs stored in the memory 24. The CPU 21 also includes a plurality of cores #1 and #2, and can execute a plurality of processings in parallel.

According to this embodiment, the physical computer A constitutes a computer system of an active system, while the physical computer B constitutes a computer system of a standby system.

Figure 2:
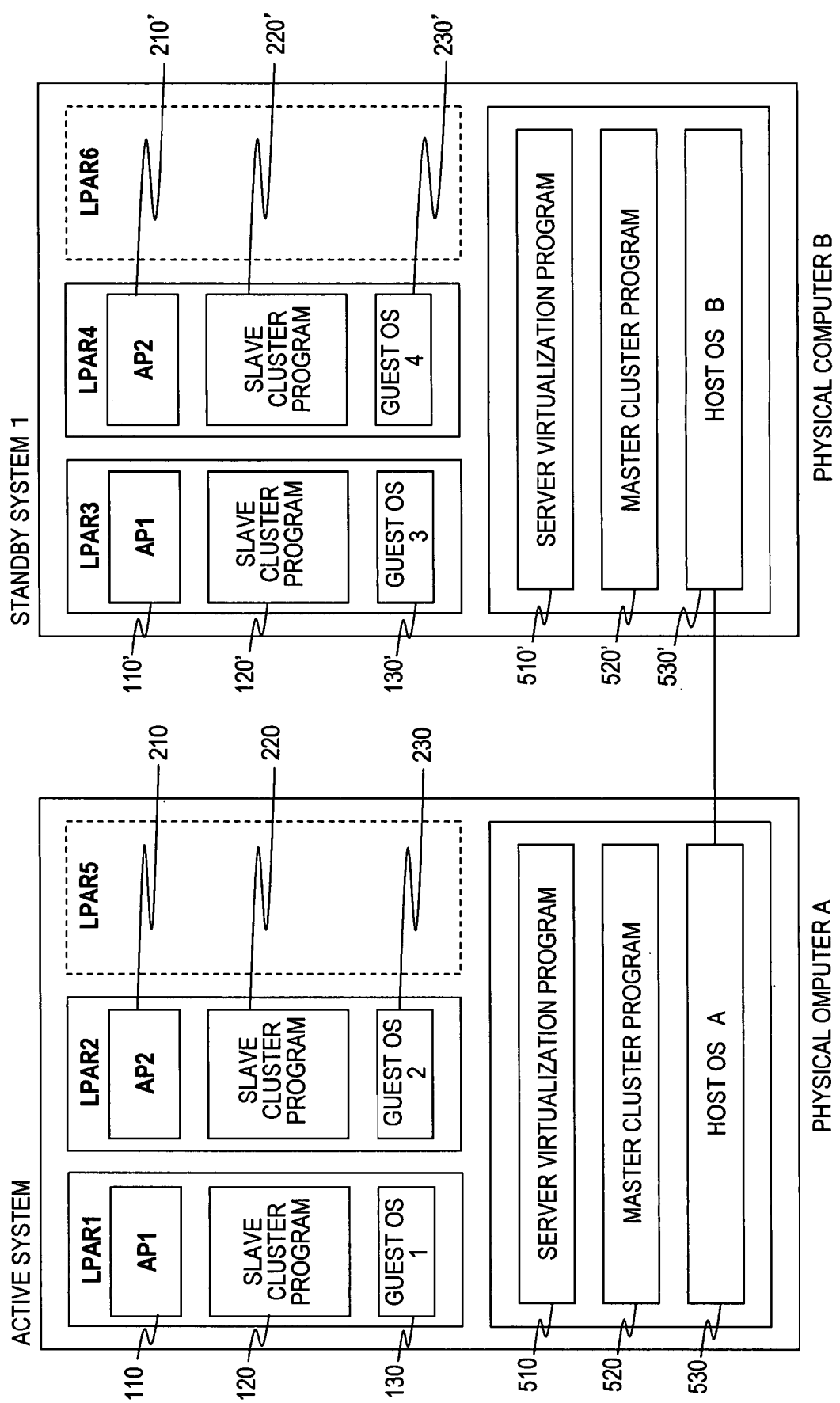
FIG. 2 is a functional block diagram mainly showing software of a server virtualization environment in the physical computers of the first embodiment.

FIG. 2 is a functional block diagram mainly showing software of the server virtualization environment of the physical computers shown in FIG. 1.

In the physical computer "A" constituting the active system, a server virtualization program 510 constituting a logical partition (hereinafter, referred to as LPAR) in a host OS_A 530 is operated to provide an LPAR 1 and an LPAR 2. The server virtualization program 510 also provides a new LPAR 5 different from the LPAR 1 and the LPAR 2. The host OS 530 and the sever virtualization program 510 constitute a virtualization unit. A guest OS 1 130 is executed in the LPAR 1, an application (AP 1) 110 is operated in the guest OS 1, and a slave cluster program 120 (first cluster management unit) for monitoring the application 110 to perform failover between the active system and the standby system is operated. A guest OS 2 230 is executed in the LPAR 2, an application (AP 2) 210 is operated in the guest OS 2 230, and a slave cluster program 220 for monitoring the application (AP 2) 210 is operated. In the LPAR 5, no guest OS or application is operated. When optional LPAR of the active or standby system is failed over, a guest OS, an application, and a slave cluster program of the failed-over LPAR are operated in the LPAR 5. The LPAR 5 may be a preset LPAR, or a new LPAR provided by the server virtualization program when the failover is carried out. In the host OS_A, a master cluster program 520 (second cluster management unit) is operated to perform failover by monitoring the guest OS's of the LPAR's 1 and 2 or other virtualization units, failing over the guest OS and the application between the LPAR of the active or the standby system and the new LPAR 5, and starting the LPAR 5, the guest OS and the application.

In the physical computer B constituting the standby system, software configured as in the case of that of the physical computer A of the active system is executed. That is, in the physical computer B, a server virtualization program 510' constituting LPAR 3 and LPAR 4 in a host OS_B 530' is operated. The server virtualization program 510' also provides a new LPAR 6 different from LPAR 1 and the LPAR 2. In the LPAR 3, a guest OS 3 130' and a guest OS 4 230' are executed, applications (AP 1 and AP 2) 110' and 210' for failover from the active system are operated in the guest OS 3 and the guest OS 4, and slave cluster programs 120' and 220' for monitoring the application AP 1 to perform failover between the active system and the standby system is operated. The guest OS 4 230' is executed in the LPAR 4, an application (AP 2) 210' for failover from the active system is operated in the guest OS 4 230', and a slave cluster program 220' for monitoring the application AP 2 210' is operated. In the LPAR 6, no guest OS or application is operated. When optional LPAR of the active or standby system is failed over, a guest OS, an application, and a slave cluster program of the failed-over LPAR are operated. In the host OS_B, a master cluster program 520' for monitoring the guest OS's of the LPAR's 3 and 4 or other virtualization units is operated. The master cluster program 520' performs failover by failing over the guest OS and the application between the LPAR of the active or the standby system and the new LPAR 6, and starting the guest OS and the application. For example, the failing-over of the guest OS and the application executed by the master program may be realized by using a disk device which starts the guest OS or the application by the new LPAR, or by using snapshots during the operation of the guest OS or the application. The LPAR 5 and the LPAR 6 constitute a third system which functions as a cold standby system.

Figure 3:
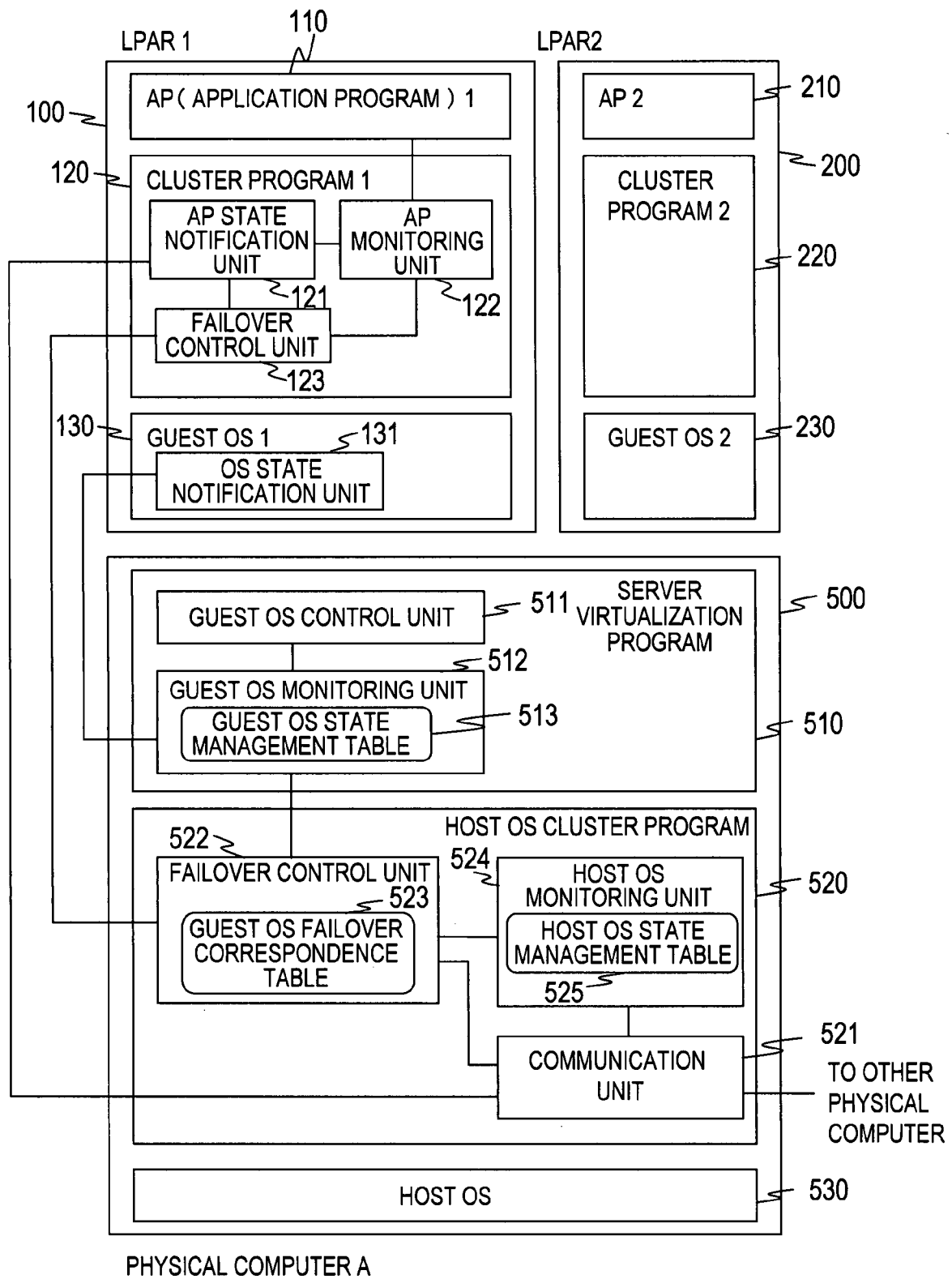
FIG. 3 is a block diagram showing detailed configuration of software executed by the active system physical computer of the first embodiment.

FIG. 3 is a block diagram showing a detailed configuration of software executed by the physical computer A of the active system. Since the plurality of physical computers A and B are similar in configuration as described above, FIG. 3 shows only the software configuration of the physical computer A, while the software configuration of the physical computer B is not shown. Because the plurality of LPAR's of the physical computer "A" are similar in configuration, only the LPAR 1 will be described while detailed description of another LPAR, the LPAR 2, is omitted.

The physical computer A includes a logical host node 500 in which the server virtualization program 510 for managing the LPAR's 1 and 2 is operated, and LPAR groups 100 (LPAR 1) and 200 (LPAR 2) managed by the server virtualization program 510.

The LPAR 100 in which a guest OS 130 is operated as an OS includes an application program (AP 1) 110 for performing operations, and a slave cluster program 120 for monitoring a state of the application 110 and executing failover between the active system and the standby system in the guest OS.

The slave cluster program 120 includes an application state monitoring unit 122 for monitoring a state of the application 110, and notifies an application state obtained by the application state monitoring unit 122 as a heartbeat to the slave cluster program 120' of the standby system via a communication unit 521 of the host OS 530. The slave cluster program 120 further includes an application state notification unit 121 for receiving a notification from the slave cluster program 120' of the standby system, and a failover control unit 123 for monitoring states of the applications 110 and 210 of the active system based on heartbeats when the slave cluster program 120 is operated as a standby system, and executing failover when a failure occurs in the application of the active system. As heartbeats indicating an operation state of the application 110, data or a file generated by the application 110 can be included in addition to a signal generated during execution of the application 110, and those pieces of information constitute an operation state indicating the operation state of the application 110. The heartbeats can be detected by detecting the operation state of the application 110.

For example, an opportunity taken by the failover control unit 123 to execute failover includes a case where an application state included in the heartbeats is abnormal or a case where the heartbeats are cut off because of a failure of the cluster program 120, the guest OS 1 130 or the host node 500. Notification of the application state by the notification unit 121 may be executed by directly accessing the NIC 16 without passing through the communication unit 521 of the host OS 530.

The guest OS 1 130 includes an OS state notification unit 131 for instructing a state of the guest OS 1 130 to the cluster program (master cluster program) 520 of the host OS 530.

The host node 500 in which the host OS 530 (OS_A) is operated includes a server virtualization program 510 for managing the LPAR's 1 and 2, and a master cluster program 520 of the host OS 530.

The server virtualization program 510 includes a guest OS control unit 511 for allocating physical computer resources (hardware) shown in FIG. 1 to the guest OS 1 130, and a guest OS monitoring unit 512 for managing an operation state of the guest OS obtained from the guest OS 1 130. The guest OS monitoring unit 512 includes a guest state management table 513 shown in FIG. 6. The guest OS stage management table 513 shown in FIG. 6 contains a guest OS identifier 3001 of the guest OS's 130 and 230 managed by the server virtualization program 510, a guest OS state 3002 having the identifiers, and guest OS state update time 3003 for updating information of a state of the guest OS 530. The guest OS state management table 513 of FIG. 6 indicates states of the guest OS1 and guest OS 2 operated in the sever node 500 of the active system. In this case, the table indicates the state of the guest OS 1 130 is normal at time t3, and the state of the guest OS 2 230 is normal at time t4.

The master cluster program 520 of the active system includes a communication unit 521 capable of communicating with the other physical computer, i.e., the physical computer B, and the slave cluster programs 120 and 220 of the host OS 530, a host OS state management table 525 for recording an operation state of the host OS 530, a host OS monitoring unit 524 for monitoring the operation state of the host OS 530, and a failover control unit 522 for instructing failover to the slave cluster programs 120 and 220 which become failover destinations when failures occur in the host OS 530 and the guest OS's 130 and 230.

The master cluster program 520 can monitor a failure of the other host OS or the guest OS by executing heartbeat monitoring with the other master cluster program 520' through the communication unit 521.

The failover control unit 522 includes a guest OS failover correspondence table 523 for recording a cluster configuration constituted of the slave cluster programs 120 and 220 of the guest OS 530, and can monitor failures of the host OS and the guest OS of its own physical computer by obtaining states of the guest OS's 130 and 230 and the host OS 530 from the guest OS monitoring unit 512 or the host OS monitoring unit 524 of the host OS 530.

As shown in FIG. 5, the host OS state management table 525 contains a host OS identifier 2001, a guest OS identifier group 2002, the guest OS managed by the host OS, a host OS operation state 2003, and host OS state update time 2004 of the operation state. The example shown in FIG. 5 indicates that a state of the host OS_A of the active system is good, the guest OS 1 and guest OS 2 are operated in the active system, a state of the host OS_B of the standby system is good, and the guest OS 3 and guest OS 4 are operated in the standby system.

As shown in FIG. 4, the guest OS failover correspondence table 523 contains an application identifier 1001 of the applications AP 1 and AP 2 of monitoring targets and identifiers 1010 and 1020 of an OS group (host OS and guest OS) constituting a cluster thereof based on an inter-guest OS cluster configuration constituted of the slave cluster programs 120 and 220. The identifiers 1010 and 1020 include, for each application identifier 1001, guest OS identifiers 1012 and 1022 in which applications are operated, and host OS identifiers 1011 and 1021 for managing the LPAR's in which the guest OS's are operated, which are set for each host OS in which the application is operated. The example of FIG. 4 shows that the host OS_A of the computer system of the active system and the host OS_B of the computer system of the standby system constitute a cluster, the application AP 1 constitutes a cluster for executing failover between the guest OS 1 of the host OS_A of the active system and the guest OS 3 of the host OS_B of the standby system, and the application AP 2 constitutes a cluster for executing failover between the guest OS 2 of the host OS_A of the active system and the guest OS 4 of the host OS_B of the standby system.

Figure 7:
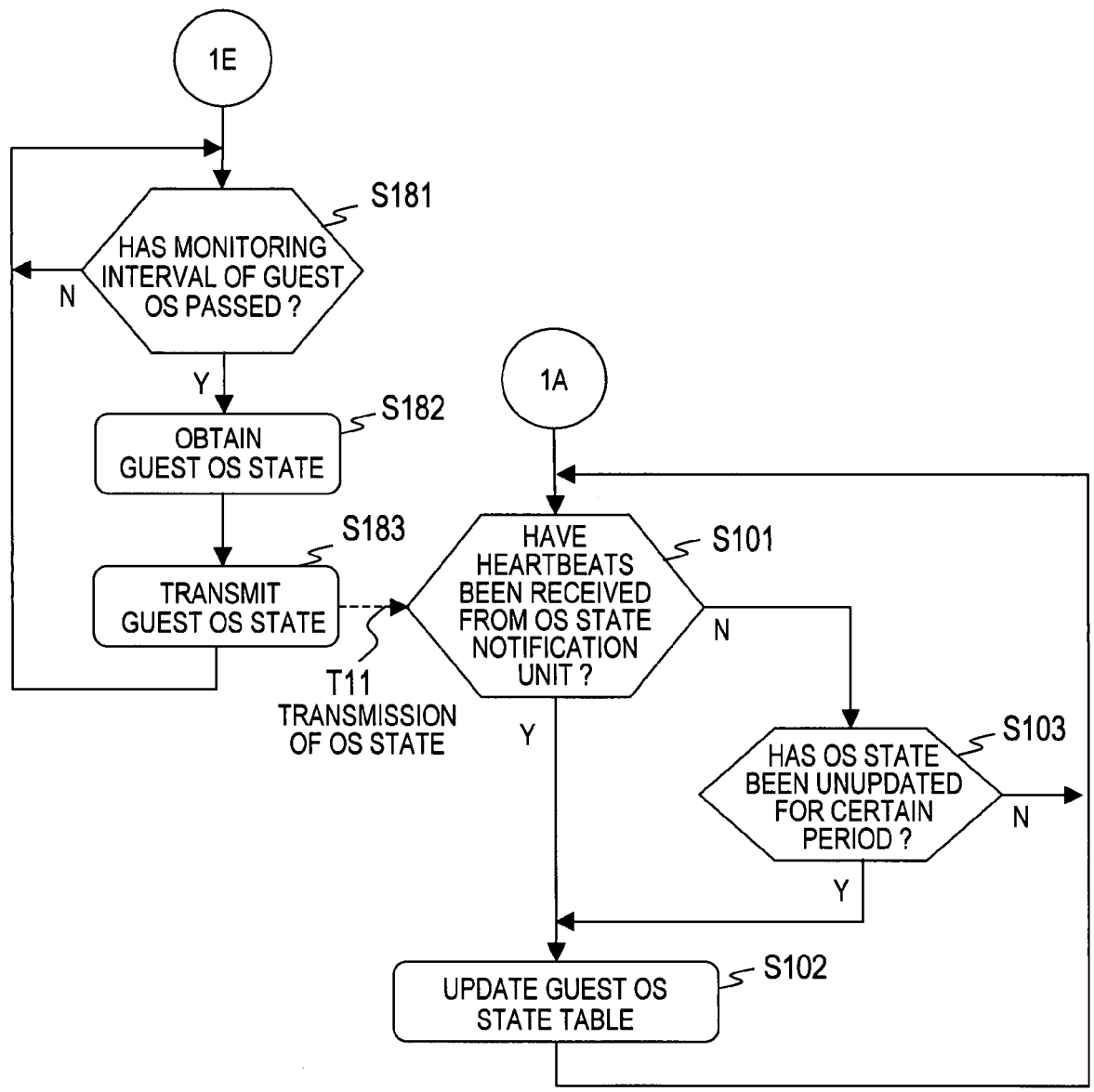
FIG. 7 is a flowchart showing an example of processing in which an active system master cluster program detects a state of the active system guest OS according to the first embodiment.
Figure 8:
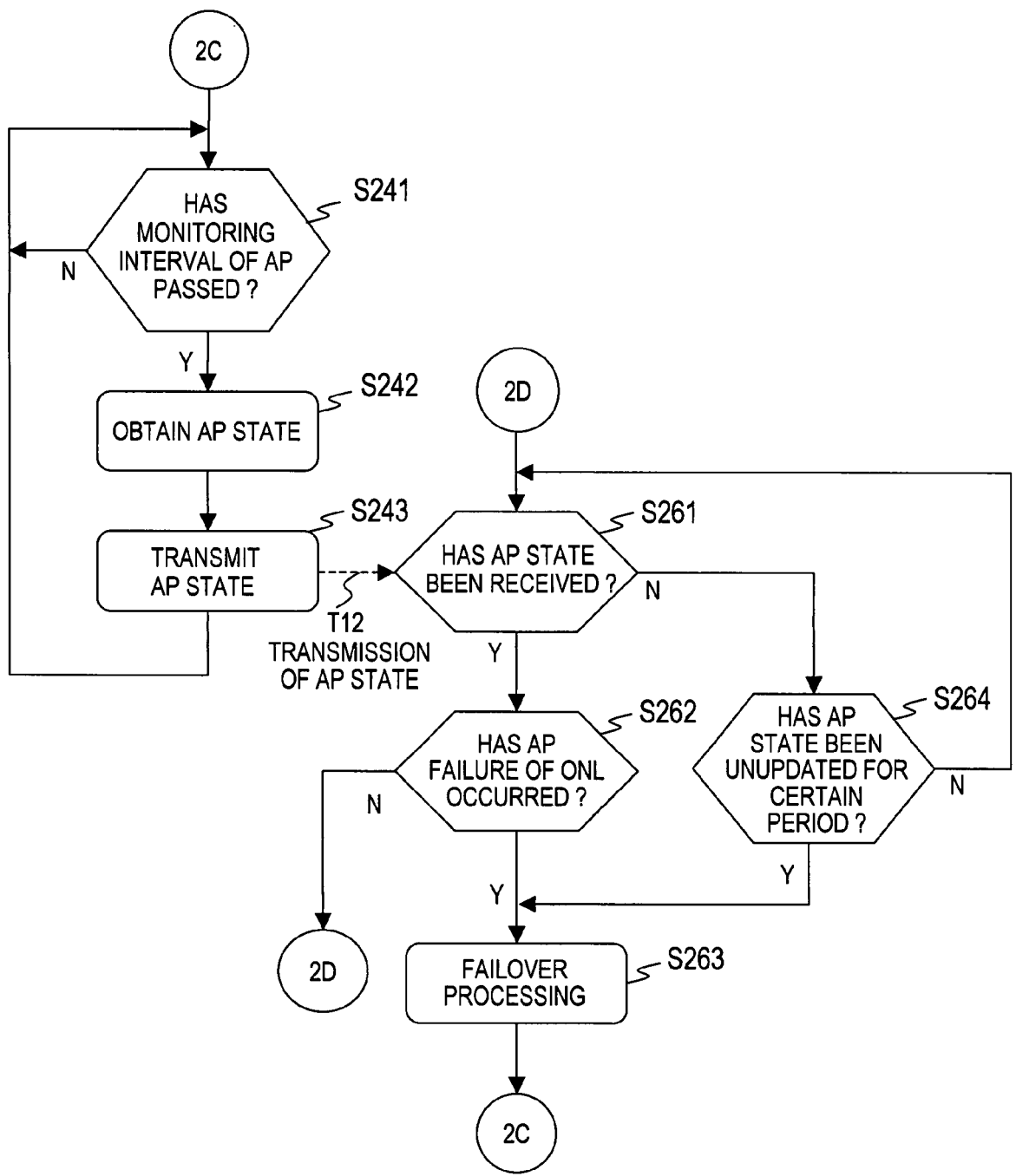
FIG. 8 is a flowchart showing an example of failover processing between slave cluster programs through heartbeats according to the first embodiment.
Figure 9:
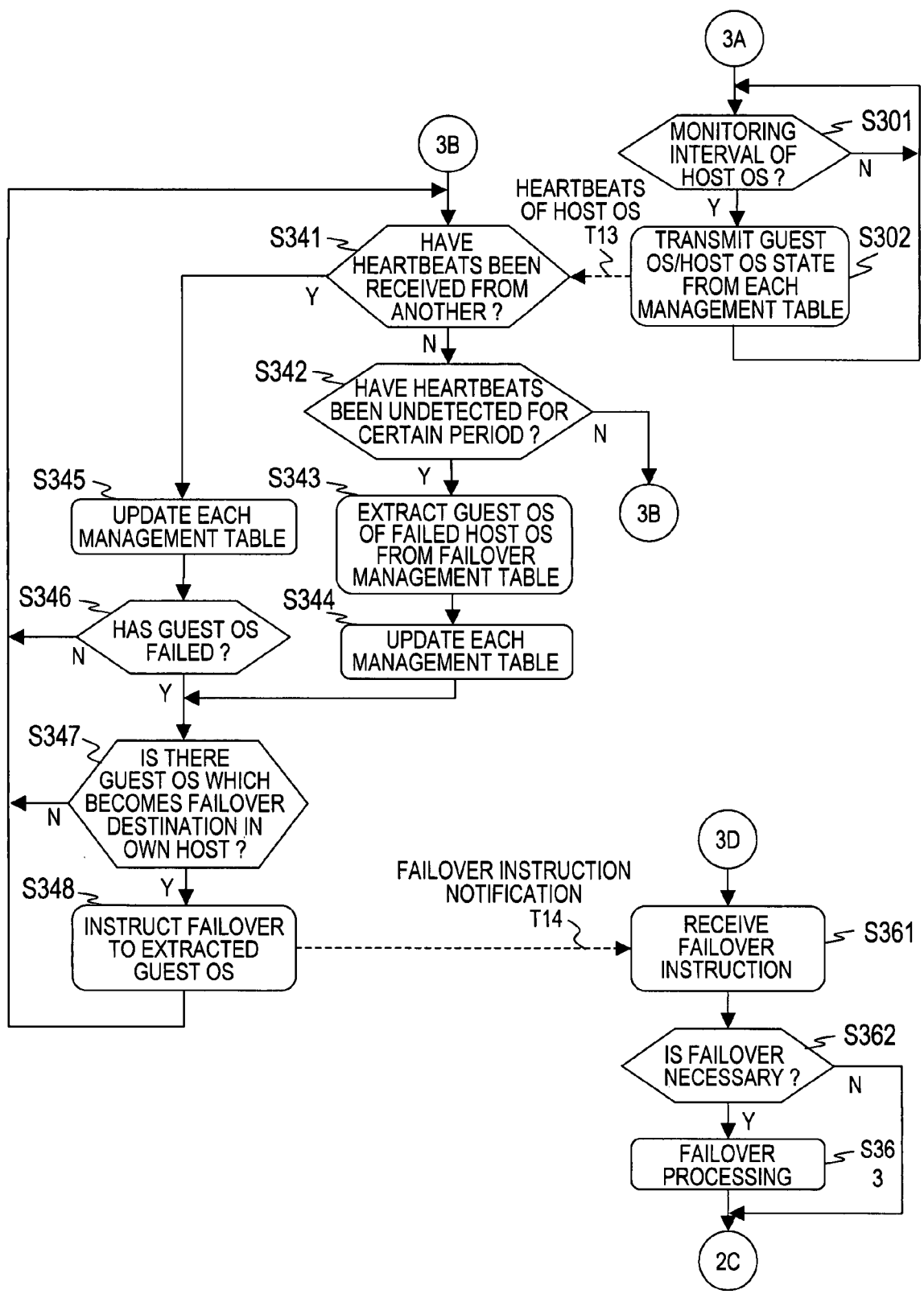
FIG. 9 is a flowchart showing an example of guest OS failover processing between master cluster programs through heartbeats according to the first embodiment.

FIGS. 7 to 9 are flowcharts showing operations of the first embodiment.

In the similar flowcharts below, reference symbols A/B (1A, 3A, and 3B) indicate operations of the master cluster programs 520 and 520' of the active and standby systems, C/D (2C, 2D, and 3D), operations of the slave cluster programs of the active and standby systems, and 1E, an operation of the guest OS of the active system. Each operation includes an operation associated with modules other than each cluster program.

FIG. 7 is a flowchart showing an example of processing in which the master cluster program 520 of the active system detects states (guest OS states) of the guest OS's 130 and 230 of the active system. In the description below, processing of the guest OS 1 130 of the active system will be explained. However, processing of the other guest OS, i.e., the guest OS 2, and the standby system is similarly performed.

First, the OS state notification unit 131 of the guest OS 130 of the active system judges whether predetermined monitor interval of the guest OS 1 has passed (S181). If the monitor interval has not passed, judgment is continuously performed. On the other hand, if the predetermined monitor interval has passed, a state of the own guest OS 130 is obtained (S182), and the state of the guest OS 130 is notified to the guest OS monitoring unit 512 of the sever virtualization program 510 of the host OS 530 (S183, notification T11).

Then, in the sever virtualization program 510 of the active system, judgment is made as to whether the guest OS monitoring unit 512 has received the notification T11 (S101). If the notification T11 has been received, the guest OS state management table 513 is updated according to the received contents (S102). On the other hand, if the notification T11 has not been received, the guest OS monitoring unit 512 judges whether the guest OS state management table 513 has not been updated for predetermined monitor interval in which the guest OS is regarded as a failure (S103). If the guest OS state management table 513 has not been updated, the guest OS 130 is judged to be in a failure state, and the guest OS state management table 513 is updated in the step S102. On the other hand, if the guest OS state management table 513 has been updated, the guest OS monitoring unit 512 returns to the step S101 to wait for heartbeats from the guest OS.

FIG. 8 is a flowchart showing failover executed based on heartbeats between the slave cluster programs 120 and 120'. First, the application monitoring unit 122 of the slave cluster program 120 of the active system judges whether predetermined monitor interval of the application AP 1 110 has passed (S241), and continues the judgment if the monitor interval has not passed. On the other hand, if the predetermined monitor interval has passed, the application monitoring unit 122 obtains a state of the application 110 of the own guest OS 130 (S242), and the application state notification unit 121 notifies the application state to the slave cluster program 120' of the guest OS 130' of the standby system (S243, notification T12). In this case, the application state may include information other than information indicating an operation state of the application AP 1, e.g., processing contents or the like of the application AP 1. The application state notification unit 121 transmits the application state as the notification T12 to the storage cluster program 120' of the standby system via the communication unit 521 of the master cluster program 520.

Then, in the slave cluster program 120' of the standby system, the application state notification unit 121 judges whether the notification T12 indicating the state of the application AP 1 of the active system has been received (S261). If the notification T12 has been received, the application state notification unit 121 judges whether it is a notification of a failure of the application AP 1 110 of the active system (S262). If a failure has occurred, failover processing of the application AP 1 110 is executed (S263). In other words, the slave cluster program 120' of the standby system operates the application 110' (AP 1) of the guest OS 130' of the standby system.

On the other hand, if no failure has occurred, the slave cluster program 120' of the standby system returns to the step S261 to wait for the notification T12 of the application state again. In the step S261, if the notification T12 has not been received, the slave cluster program 120' judges whether the notification T12 has not been updated for predetermined monitor interval in which the application 110 (AP 1) of the active system is regarded to be a failure (S264). If the notification T12 has not been updated, the guest OS 130 of the active system is in a failure state, and thus the slave cluster program 120' of the standby system executes failover (S263). After completion of the failover, the slave cluster program 120' of the active system executes processing 2C as a slave cluster program. On the other hand, if the notification T12 has been updated, the slave cluster program 120' of the standby system returns to the step S261 to monitor a state of the application of the active system.

FIG. 9 is a flowchart showing failover of the guest OS executed based on heartbeats between the master cluster programs 520 and 520'. First, the mater cluster program 520 of the active system executes processing 3A of FIG. 9 to judge whether predetermined monitor interval of the own host OS 530 has passed (S301). If the monitor interval has not passed, the judgment is continuously performed. On the other hand, if the predetermined monitor interval has passed, the master cluster program 520 transmits a state of the own host OS of the host OS state management table 525 and a state of the guest OS of the guest OS state management table 513 as heartbeats to the master cluster program 520' of the standby system via the communication unit 521 (step S302, notification T13). This notification T13 collects a state of the host OS 530 and states of the guest OS's 130 and 230.

Then, the master cluster program 520' of the standby system executes processing 3B of FIG. 9 to monitor reception of the notification T13 as a heartbeat (S341). If no heartbeat has been received from the master cluster program 520 of the active system, reference is made to the host OS state update time 2004, i.e., the last update time 2004 of the host OS 530 of the active system notified through the heartbeat, to judge whether the notification T13 has not been received for predetermined monitor interval in which the host OS 530 of the active system is regarded to be a failure. If the notification T13 has not been received, the master cluster program 520' of the standby system judges that the host OS 530 of the active system is in a failure state to proceed to processing of S343 (S342). The update time 2004 can be referred to from the host OS state management table 525 of the master cluster program 520'.

In the step S343 in which the failure of the host OS 530 of the active system is detected, the master cluster program 520' of the standby system refers to the failover correspondence table 523 to extract the guest OS of the failed host OS (S343).

Judging that the guest OS extracted in the step S343 and the host OS not notified in the step S342 are in failure states, the master cluster program 520' of the standby system updates the guest OS state management table 513 and the host OS state management table 525 (step S344) to proceed to a step S347. On the other hand, if the notification T13 has been received, the master cluster program 520' of the standby system returns to the step S341 to wait for a heartbeat of the host OS 530 of the active system from the master cluster program 520 of the active system.

Then, upon reception of the heartbeat in the step S341, the master cluster program 520' of the standby system updates the host OS management table 525 and the guest OS state management table 513 according to received contents (S345). Reference is subsequently made to the management table 513 to judge whether a guest OS failure has occurred (S346). If no failure has occurred, the master cluster program 520' of the standby system returns to the step S341 to wait for a heartbeat from the host OS of the active system.

On the other hand, if a failure has occurred in the host OS of the active system, the step S347 is executed.

In the step S347, by referring to the guest OS failover correspondence table 523, judgment is made as to whether the failed guest OS extracted in the step S343 or the step S346 is present in the own host OS. If the failed guest OS is not present in the own host OS, failover processing is not necessarily performed, and thus the master cluster program 520' returns to the step S341 again to wait for a heartbeat from the host OS.

On the other hand, if the failed guest OS is present in the own host OS 530', failover processing by the slave cluster programs 120' and 220' is necessarily performed, and thus the master cluster program 520' instructs failover of the extracted guest OS to the slave cluster program 120' (220') (S348, notification T14). The master cluster program 520' that has transmitted the notification T14 returns to the step S341 to wait for a heartbeat of the host OS 530 of the active system. In this case, the step S349 and the notification T14 may not be explicit failover instructions, but may be notifications of a failure of the guest OS.

Upon reception of the notification T14 by the application state notification unit 121 (S361), the slave cluster program 120' (or 220') of the standby system judges whether failover is necessarily performed (S362). If the failover is judged to be necessarily performed, the slave cluster program 120' of the standby system executes failover in the step S363. In other words, the guest OS 130 and the application 110 of the active system are failed over to those of the standby system. After completion of the failover, the slave cluster program 120' of the standby system executes processing 2C (FIG. 8) as a slave cluster program of the active system. On the other hand, if failover is not necessarily performed, the slave cluster program 120' of the standby system carries out nothing. For example, if failover is not necessarily performed, the failure may have been detected through a heartbeat between the slave cluster programs beforehand, and the failover step S263 shown in FIG. 8 may have been executed.

Upon completion of the failover, as the failover has been executed for the detected failure, failure states of the guest OS 130 (230) and the host OS 530 may be changed. In this case, an opportunity for the change may include a case where the completion of the failover is notified to the master cluster program 520 by the slave cluster program 120 (220), a case where normal states of the host OS and the guest OS restored from the failures are monitored, or a case where an administrator of the master cluster program 520 explicitly instructs a change.

The failover processing of each of the steps S263 and S363 is executed based on the system state managed by the slave cluster program 120 (120').

According to the first embodiment, in the failover correspondence table 523 of FIG. 4, the application identifier is provided as the identifier indicating correspondence between the host OS/guest OS of the active and standby systems. However, a unique numeral may be used as an identifier.

When the guest OS 130 (or 230), the application 110 (or 210), and the slave cluster program 120 (or 220) of the active system are failed over to the LPAR 6 set to be cold standby in the standby system, processing can be carried out as in the case of FIG. 8.

For example, by assuming that the master cluster program 520 of the active system executes the processing 2C of FIG. 8, and the master cluster program 520' of the standby system executes the processing 2D of FIG. 8, and by changing the application state of FIG. 8 to a guest OS state or a host OS state, the master cluster program 520 monitors the guest OS's 130 and 230 and the host OS 530 of the active system. Then, when a failure occurs in the active system, the master cluster program 520' of the standby system executes failover (S263) of FIG. 8). In this case, the failover processing of the step S263 of FIG. 8 is changed to cold standby failover, and the master cluster program 520' of the standby system starts the guest OS 130 of the active system in the LPAR 6, and starts the application AP 1 and the slave cluster program 120, whereby the guest OS can be taken over from the active stage to the LPAR 6 of the standby system. Accordingly, the failover can be executed to the LPAR 6 which is a cold standby system. In this case, the master cluster programs 520 and 520' can update the management tables as in the aforementioned case.

Through the series of processing shown in FIGS. 3 to 9, when the failure of the host OS 530 of the active system is detected by the master cluster program of the host OS 530 of the standby system, the guest OS can be failed over. Thus, it is possible to realize a hot standby failover method in which a plurality of different failovers are not carried out simultaneously for one failure while master/slave cluster programs are provided in the host OS and the guest OS, thereby solving the third and fourth problems. Hence, it is possible to realize smooth failover by preventing competition during failover even when there are many guest OS's.

Second Embodiment

Figure 10:
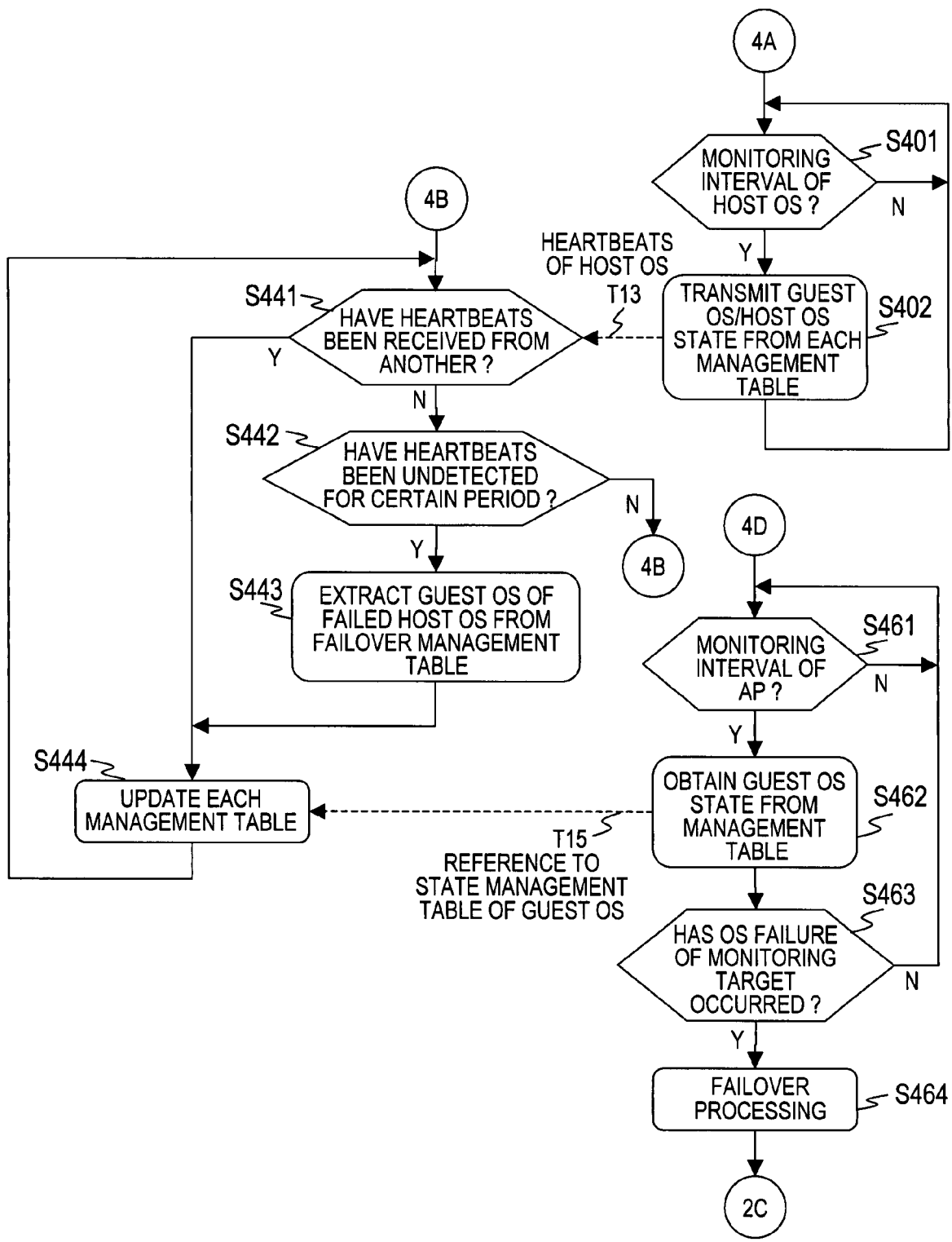
FIG. 10 is a flowchart showing an example of guest OS failover processing between master cluster programs through heartbeats according to a second embodiment.

FIG. 10 is a flowchart showing a second embodiment which is partially changed from the first embodiment of FIG. 9. Other components are similar to those of the first embodiment.

In FIG. 10, a master cluster program 520 of an active system executes processing 4A of FIG. 10, and executes steps S401 and S402 of FIG. 10 as in the case of the steps S301 and 302 of FIG. 9 to transmit a notification T13 of a guest OS state.

A master cluster program 520' of a standby system executes processing 3B of FIG. 10, and judges whether the notification T13 has been received from the master cluster program 520 of the active system as in the case of the step S341 (S441). If the notification T13 has been received, as in the case of the step S345 of FIG. 9, according to received contents, the master cluster program 520' of the standby system updates management tables 525 and 513 (S444), and returns again to the step S441 to wait for a heartbeat from a host OS.

On the other hand, if the notification T13 as a heartbeat has not been received from the master cluster program 520 of the active system in the step S441, the master cluster program 520' of the standby system executes steps S442 and S443 similar to the steps S342 and S343 of FIG. 9. If a period of being incapable of receiving the notification T13 is less than predetermined time in the step S442, the process returns to the step S441 to wait for a heartbeat from a host OS 530. On the other hand, if the period of being incapable of receiving the notification T13 exceeds the predetermined time, as in the case of the step S343 of FIG. 9, judging that a failure has occurred in the host OS 530 of the active system, a guest OS 130 (230) of the failed host OS 530 is extracted. After an end of the step S443, as the host OS 530 of the active system is in the failure state, as in the case of the step S344, a step S444 is executed to update the management tables 513 and 525 judging that the extracted guest OS and a host OS not notified are in failure states.

Then, a slave cluster program 120' (220') of a standby system executes processing 4D of FIG. 10 to judge whether monitor interval of a guest OS (or application) has passed (S461). If the monitor interval has not passed, monitoring is continued. On the other hand, if the predetermined monitor interval has passed, a failover control unit 123 refers to the guest OS state management table 513 of the master cluster program (step S462). The slave cluster program 120' of the standby system judges whether a failure has occurred in a guest OS in which a slave cluster program 120 (220) of the active system is operated based on the state of the guest OS obtained in the step S462 (S463). If no failure has occurred, the process returns to the step S461 to continue monitoring of the guest OS. On the other hand, if failures have occurred in the guest OS's 130 and 230 of the active system, failover step is executed in a step S464 as in the case of the step S363 of FIG. 9. After completion of failover, the slave cluster program 120' of the standby system executes processing 2C as a slave cluster program of the active system (FIG. 8).

Accordingly, by substituting the flowchart of FIG. 10 for FIG. 9 of the first embodiment, the slave cluster program 120' of the standby system can monitor a failure of a guest OS when a failure occurs in the host OS of the active system via a heartbeat of the master cluster program 520'. Thus, only when a failure occurs, failure monitoring is enabled only by implementing a heartbeat between the physical computers. Hence, as in the case of the first embodiment, it is possible to realize a hot standby failover method in which a plurality of failovers are not executed simultaneously for one failure while maser and slave cluster programs are provided in the host OS and the guest OS, thereby solving the third and fourth problems described above.

According to the second embodiment, by executing monitoring of the guest OS via the host OS, and notifying information of the guest OS having a failure occurred in the heartbeat of the host OS of the active system to the standby system only when a failure occurs in the guest OS, it is possible to reduce information of the guest OS or the application notified between the host OS's when the active system and the standby system are both normal.

The heartbeat is implemented between the physical computers only when a failure occurs. Thus, in a failover environment of realizing a host standby system, even when the number of guest OS's is increased, it is possible to suppress a delay of heartbeats or a drop in performance of the active system.

Third Embodiment

Figure 11:
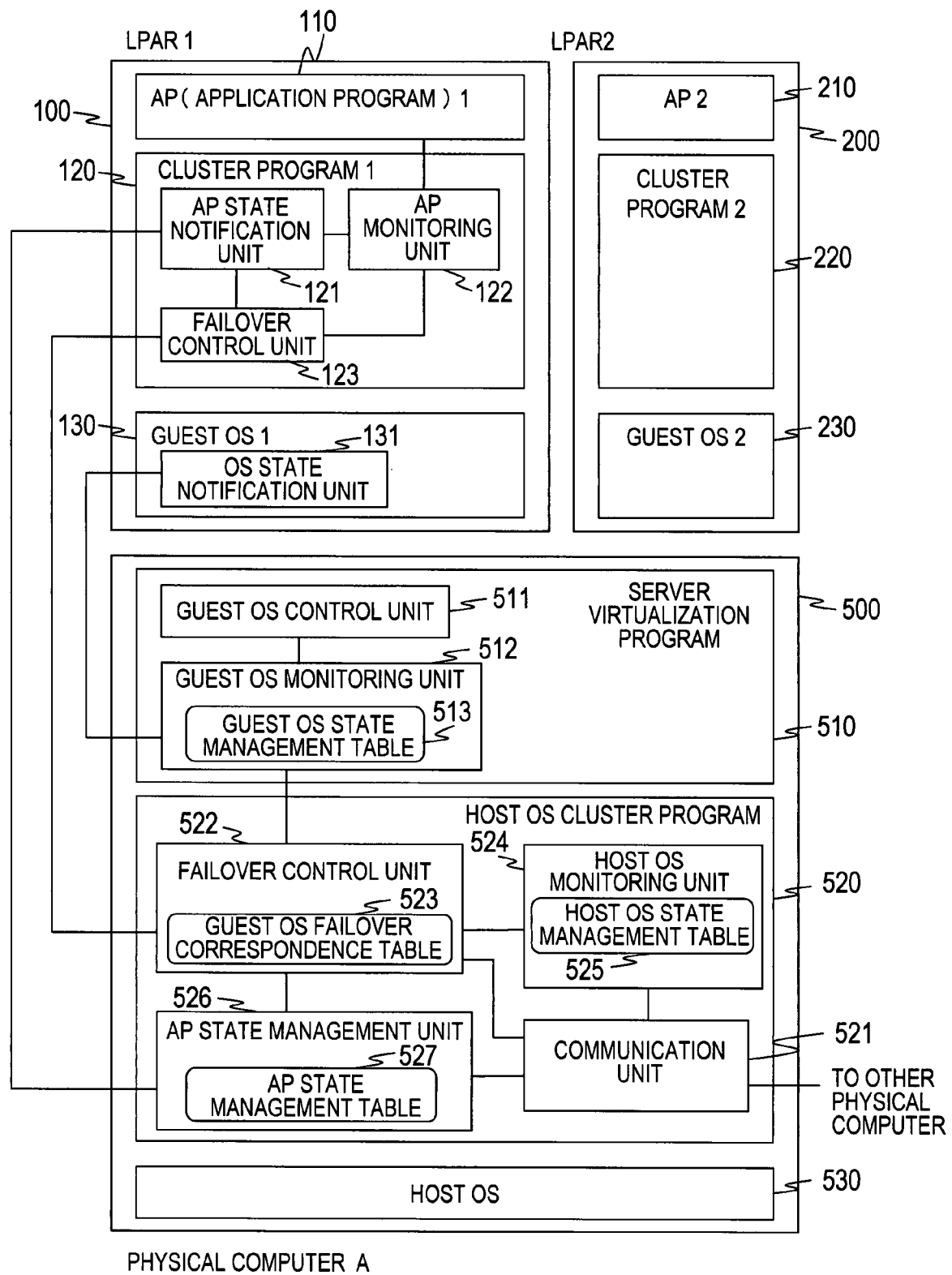
FIG. 11 is a block diagram showing a detailed configuration of software executed by an active system physical computer according to a third embodiment.

FIGS. 11 to 15 show a third embodiment. FIG. 11 is a functional block diagram of a physical computer A according to the third embodiment of this invention.

In FIG. 11, in addition to the components of the first embodiment shown in FIG. 3, the master cluster program 520 includes an application state management unit 526 for obtaining an application state from the slave cluster program 120 to monitor the application state. Because a standby system is configured as in the case of an active system, the standby system is not shown in the drawings.

The application state management unit 526 includes an application state management table 527 shown in FIG. 12. In FIG. 12, the application state management table 527 contains an application identifier 4001 of an application which is a monitoring target of the slave cluster program 120, a system state 4002 indicating an active system or a standby system as a role of the application identifier 4001 in a cluster, a host OS identifier 4003 and a guest OS identifier 4004 indicating which host and guest OS's operations are executed in, respectively, an AP operation state 4005 indicating an operation state of the application, and AP operation state update time 4006 of updating the application operation state.

In the system state 4002, an active system (ONL) and a standby system (SBY) are set for each application identifier 4001. In the application operation state 4005, "OK" is set if an operation state is good, while "NG" is set when a failure occurs or the like.

In the system state 4002, in the case of the standby system (SBY), information indicating which standby system takes failover precedence may be contained.

The failover control unit 522 of the master cluster program 520 of the host OS 530 refers to the application state management table 527 to periodically transmit heartbeats between the master cluster programs 520 and 520'.

Figure 13:
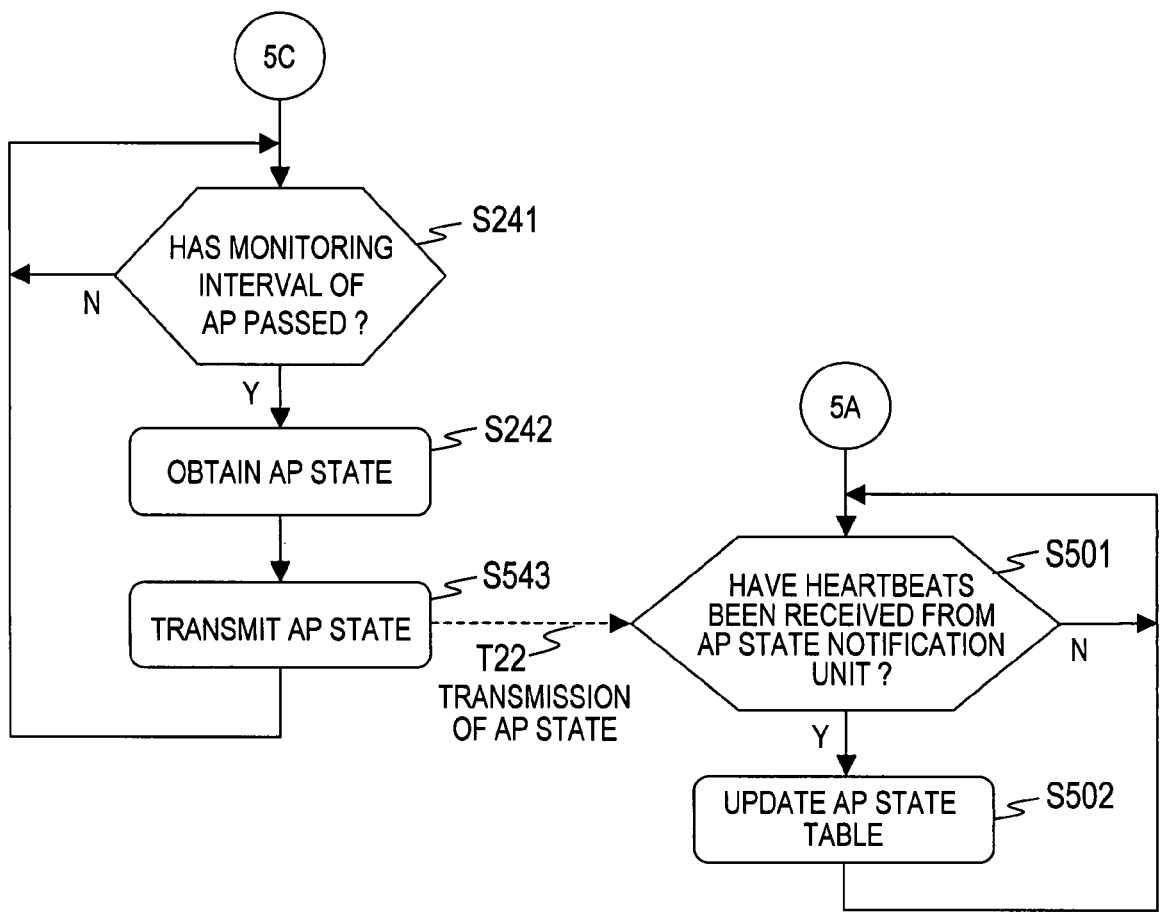
FIG. 13 is a flowchart showing an example of monitor processing of an application state executed by a slave cluster program according to the third embodiment.

FIG. 13 is a flowchart showing processing in which the slave cluster program 120 monitors an application state to notify the monitored state as a heartbeat to the master cluster program 520.

In FIG. 13, the slave cluster program 120 executes processing 5C of FIG. 13, and judges whether predetermined time has passed to monitor an application for each predetermined monitor interval (S241). If the predetermined monitor interval has not passed, the process returns to the step S241 to wait until the monitor interval passes. On the other hand, if the predetermined monitor interval has passed, the slave cluster program 120 obtains an application state through the application monitoring unit 122 (S242), and the application state notification unit 121 transmits the application state as a heartbeat to an application state management unit 526 of the master cluster program 520 (S543, notification T22).

The master cluster program 520 executes processing 5A of FIG. 13 to judge whether the application state management unit 526 has been notified of the application state through the notification T22 (S501). If notified, the application state notified to the application state management table 527 is recorded to execute updating (S502).

Figure 14:
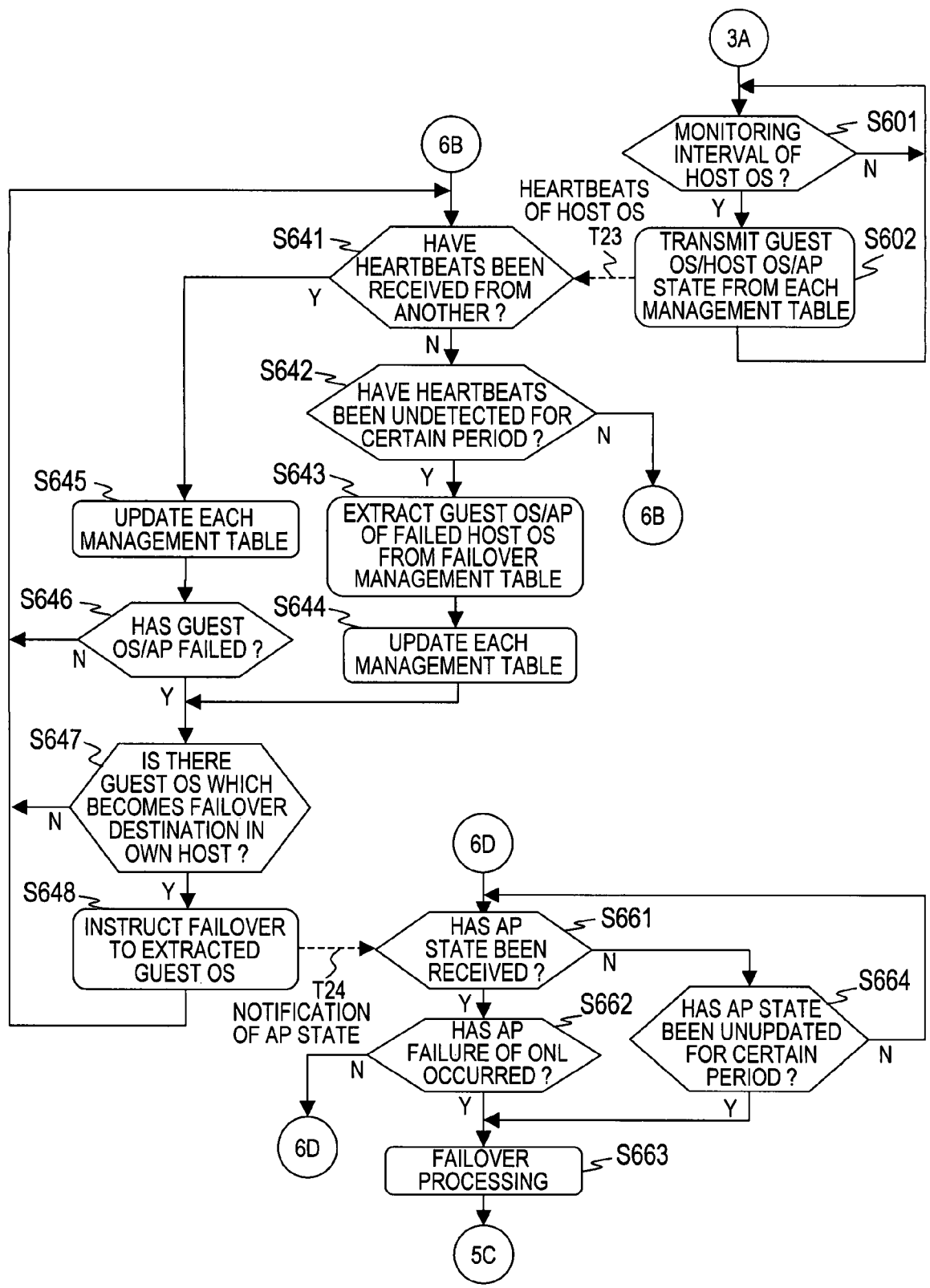
FIG. 14 is a flowchart showing an example including processing in which an active system master cluster program transmits heartbeats en bloc to a standby system and processing in which a standby system slave cluster program receives heartbeats and executes failover when a failure occurs according to the third embodiment.

FIG. 14 is a flowchart showing processing in which the heartbeat of the slave cluster program 120 notified in FIG. 13 and the heartbeat of the master cluster program 520 of the host S530 are transmitted en bloc to the standby system, and processing in which the slave cluster program 120' receives the heartbeat and executes failover when a failure occurs.

In FIG. 14, as in the case of the first embodiment of FIG. 10, the master cluster program 520 of the active system executes processing 6A in the drawing, and judges a host OS 530 whose monitor interval has passed to transmit a heartbeat for monitoring the host OS 530 for each predetermined monitor interval (S601). If the monitor interval has not passed, the process returns to the step S601 to wait until the monitor interval passes. On the other hand, if the monitor interval has passed, the application state management table 527 updated in the step S502, and a host OS state and a guest OS state obtained from the guest OS state management table 513 and the host OS state management table 525, respectively, are transmitted en bloc as heartbeats of the host OS of the active system to the master cluster program 520' of the standby system (S602, notification T23).

As shown in FIG. 15, the notification T23 contains information (host OS identifier 5001, host OS state 5002, and updating time of host OS state 5003 of the host OS 530 of the transmission source). Further, as in the case of the information of the host OS 530, the notification T23 contains pieces of information 5101 to 5103 and 5201 to 5203 of the guest OS's 130 (OS 1) and 230 (OS 2), and pieces of information 5111 to 5113 and 5211 to 5213 of applications 110 (AP 1) and 210 (AP 2) of the guest OS's 130 and 230.

In other words, the master cluster program 520 transmits a state of the host OS 530, states of the guest OS's 130 and 230, and states of the applications 110 and 210 en bloc to the master cluster program 520' of the standby system.

The master cluster program 520' of the standby system performs processing 6B of FIG. 14 to execute steps S641 to S648 similar to the steps S341 to S348 of the first embodiment shown in FIG. 9.

Processing differences of the third embodiment of FIG. 14 from the first embodiment of FIG. 9 will be described below.

First, in a step S643, if a failure occurs in the host OS 530 of the active system, a failover control unit 123 of the master cluster program 520' of the standby system refers to the failover correspondence table 523 to extract a guest OS and an application of the failed host OS. In a subsequent step S644, judging that the host OS and states of the extracted guest OS and application are in failure states, the host OS state management table 525, the guest OS state management table 513, and the application state management table 527 are updated. In the updating processing of the management tables 525, 513, and 527 of the step S645, as in the case of the step S644, the master cluster program 520' updates the management tables 525, 513, and 527. In a subsequent step S646, in addition to failure judgment of the guest OS of the step S346, reference is made to the table 527 to execute application failure detection, and the master cluster program 520' judges which of the guest OS and the application is a failure. In a step S647, judgment is made as to whether a guest OS which becomes a failover destination of the failed guest OS or application is present in the own host OS 530' as in the case of the step S347. In other words, the master cluster program 520' refers to the failover correspondence table 523 to judge presence of a guest OS of a failover destination. Lastly, in a step S648, as in the case of the step S348, the master cluster program 520' notifies a failure state of the application with respect to the guest OS extracted in the step S647 to the slave cluster program of the standby system (notification T24).

The slave cluster program 120' (220') of the standby system performs processing 6D of FIG. 14 to execute steps S661 to S664 similar to the steps S261 to S264 of the first embodiment shown in FIG. 8. Accordingly, the slave cluster program 120' can transmit heartbeats as in the case of the first embodiment of FIG. 8 in which heartbeats are transmitted between the slave cluster programs 120 and 120' in the steps S261 to S264. Further, through the notification T24, the master cluster program 520' of the standby system which is a notification destination pretends to be a slave cluster program 120 of the active system which is a heartbeat transmission source of the guest OS to communicate the notification T24 to the slave cluster program 120' of the standby system. Accordingly, the slave cluster program 120' of the standby system can receive heartbeats in a state where presence of the master cluster program 520' eliminates the necessity of setting a new program.

The notification T24 may not be a notification of an application failure but a failure notification of a guest OS or a notification of explicitly instructing failover as in the case of the notification T14. In this case, as in the case of the processing of FIG. 9, it is possible to realize failover by executing processing in which the slave cluster program 120 executes failover based on an explicit notification from the master cluster program 520.

According to the third embodiment, upon completion of the failover, a system state of the application of the guest OS 130 (230) is changed. Thus, in the failover processing, upon completion of the failover, the system state 4002 of the application state management table 527 is changed. An opportunity for changing the system state may include a case where the failover is completed by the slave cluster program 120 or a case where the slave cluster program 120 notifies changing of a system state to the master cluster program 520. Alternatively, there may be a case where when an administrator of the maser cluster program 520 explicitly instructs changing. Further, the states of the guest OS and the host OS after the failover of the first embodiment may be deleted or changed. In this case, changing of the system state and changing of the states of the guest OS and the host OS are carried out so as not to contradict each other.

Through the series of processing shown in FIGS. 10 to 15, the master cluster program 520 of the host OS 530 of the active system can collect the heartbeats of the slave cluster programs 120 and 220 of the guest OS's 130 and 230 to transmit them en bloc to the master cluster program 520' of the standby system. Further, even when the heartbeats collected by the master cluster program 520 are used, the heartbeats are realized without any new setting in the slave cluster programs 120 and 220. Thus, failure monitoring based on heartbeats between the slave cluster programs 120 and 120' can be realized without depending on the number of guest OS's, and a failover method of realizing a hot standby system can be realized, thereby solving the first problem.

Fourth Embodiment

Figure 16:
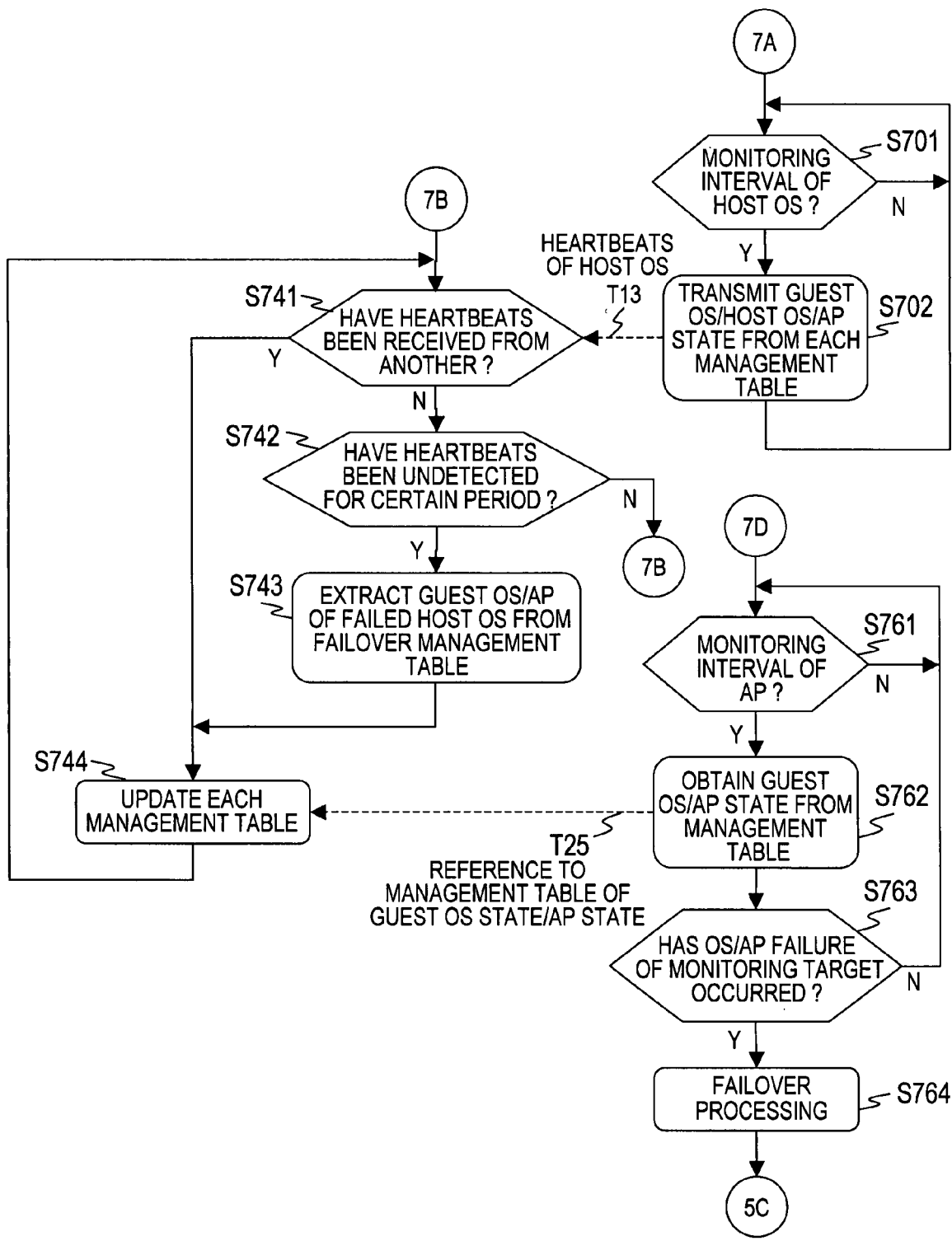
FIG. 16 is a flowchart showing an example including processing in which an active system master cluster program transmits heartbeats en bloc to a standby system and processing in which a standby system slave cluster program receives heartbeats and executes failover when a failure occurs according to a fourth embodiment.

FIG. 16 shows a fourth embodiment which is partially changed from the third embodiment shown in FIG. 14. Other components are similar to those of the third embodiment.

FIG. 16 is a flowchart showing processing in which a slave cluster program 120 (120') obtains a state of an application from a master cluster program 520 (520'), and executes failover when a failure occurs in the application.

In FIG. 16, steps S701 and S702, S741 to S744, and S761 to S764 are similar to the steps S401 and S402, S441 to S444, and S461 to S464 of the third embodiment. Processing 7A of FIG. 16 is similar to the processing 6A of the third embodiment shown in FIG. 14, and processing 7B is similar to that of the processing 6B of the third embodiment except that the steps S646 to S648 and S644 are removed. Differences from the third embodiment will be described below.

According to the fourth embodiment, first, in steps S743 and S744 of the processing 7B, in a state where a failure occurs in a host OS, as in the case of the steps S643 and S644, the master cluster program 520' of a standby system extracts the guest OS's 130 and 230 and applications 110 and 210 operated in the failed host OS 530 of an active system, and updates the host OS state management table 525, guest OS state management table 513, and application state management table 527 by judging that the applications are in failure states.

In the step S762, a slave cluster program 120' of a standby system refers to the application state management table 527 in addition to the guest OS state correspondence table 523 of the step S462 to obtain states of guest OS's 130' and 230' and an application state. Further, in the subsequent step S763, based on the obtained guest OS/application state, judgment is made as to whether failures have occurred in the guest OS's 130 and 230 in which slave cluster programs 120 and 220 of active systems are operated, and an application of a monitoring target.

By substituting FIG. 16 for FIG. 14 of the third embodiment, the master cluster program 520 of the host OS 530 can collect heartbeats of the slave cluster programs 120 and 220 of the guest OS's 130 and 230 to transmit them en bloc to the master cluster program 520' of the standby system. Thus, failure monitoring based on heartbeats between the slave cluster programs can be realized without depending on the number of guest OS's, and a failover method of realizing a hot standby system can be realized, thereby solving the first problem.

Fifth Embodiment

Figure 17:
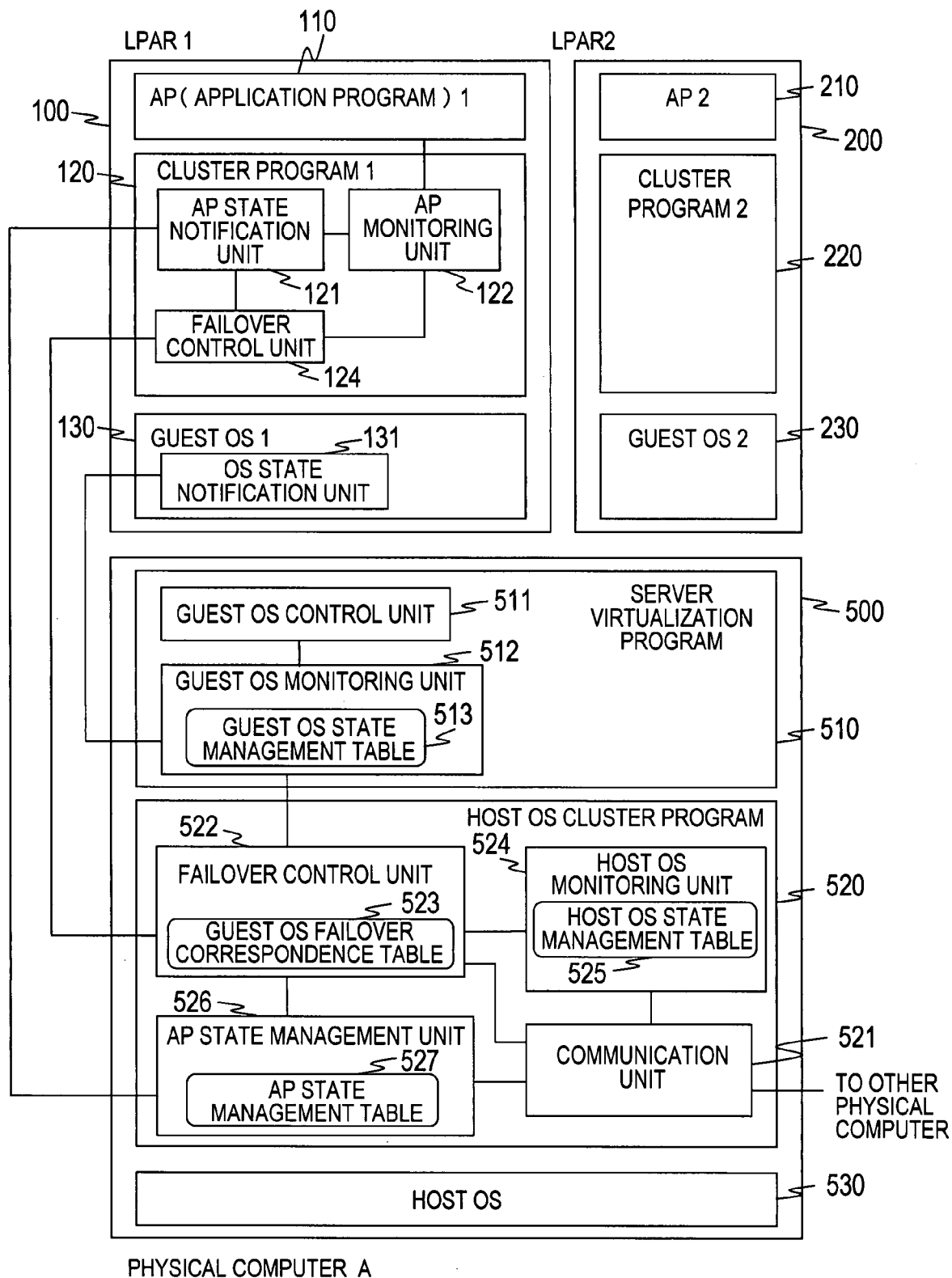
FIG. 17 is a block diagram showing a detailed configuration of software executed by an active system physical computer according to a fifth embodiment.
Figure 18:
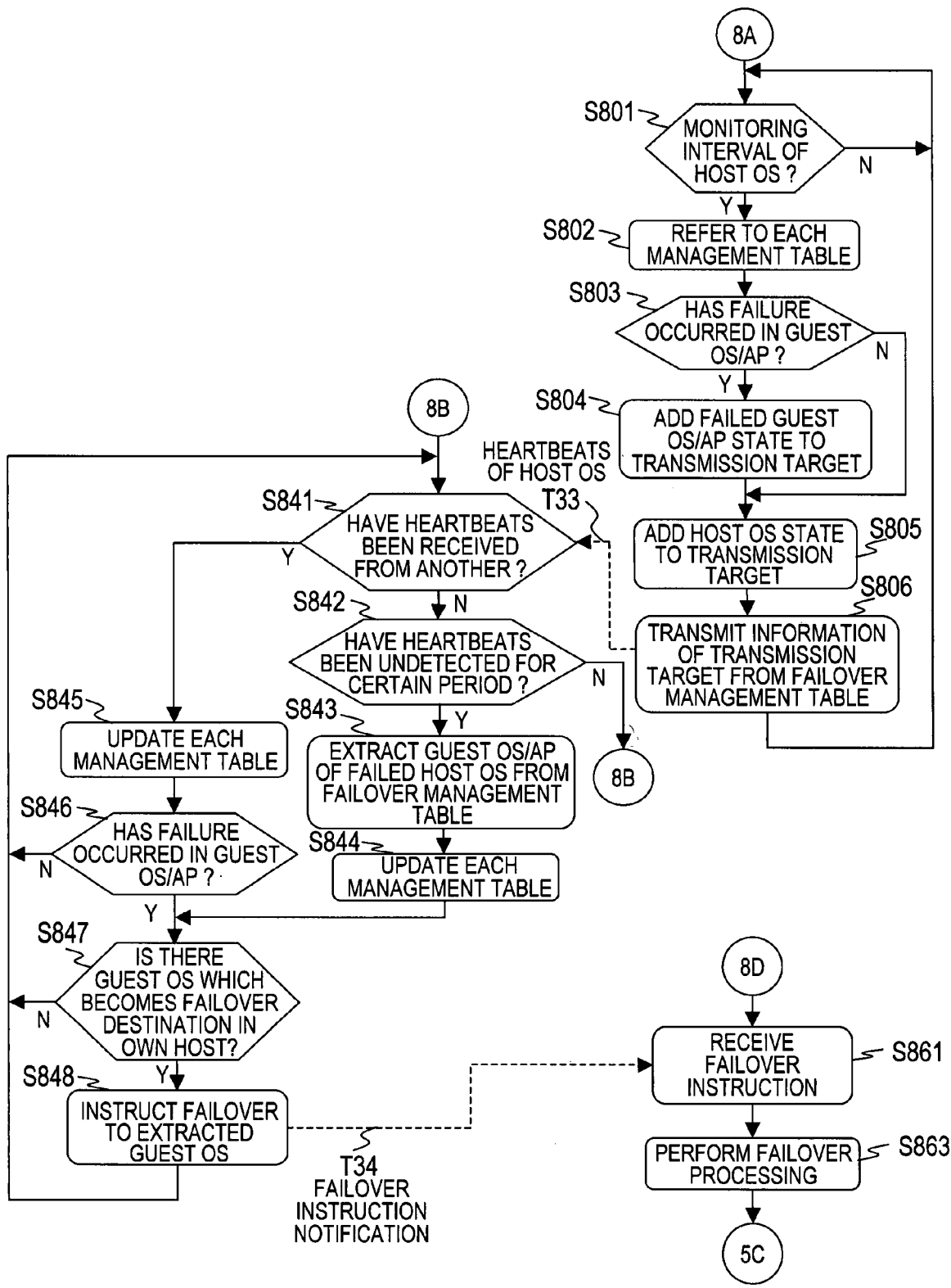
FIG. 18 is a flowchart showing an example of monitoring of an application state, transmission/reception processing of heartbeats, and failover processing at the time of failure occurrence executed by a master cluster program according to the fifth embodiment.

FIGS. 17 to 19 show processing of a fifth embodiment executed in place of those of the third embodiment shown in FIGS. 11, 14, and 15.

First, FIG. 17 is a functional block diagram of the fifth embodiment.

In FIG. 17, different from the third embodiment of FIG. 11, a slave cluster program 120 (220) includes a failover execution unit 124 for executing only failover in place of the failover control unit 123 for judging an application failure based on heartbeats between the slave cluster programs to execute failover. A role of judging an application failure to instruct failover to the failover execution unit 124 is played by a failover control unit 522 of the master cluster programs 520 and 520'.

FIG. 18 is a flowchart of monitoring of an application state and transmission/reception of heartbeats that are executed by the master cluster programs 520 and 520', and failover control when a failure occurs. Processing of an active system and processing of a standby system are similar to each other.

In FIG. 18, the master cluster program 520 executes processing 8A to first judge whether predetermined monitor interval of the host OS 530 has passed to transmit heartbeats to the master cluster program 520' for each predetermined monitor interval as in the case of the step S301 of FIG. 9 (S801). If the monitor interval has not passed, the process returns to the step S801 to wait for passage of the monitor interval. On the other hand, if the predetermined monitor interval has passed, reference is made to management tables 513 and 527 updated as in the case of the step S102 of the first embodiment and the step S502 of the second embodiment (S802) to judge whether a failure has occurred in the guest OS/application (S803).

If no failure is determined to have occurred in the step S803, as failover is not necessarily performed in the standby system, the master cluster program 520 sets only a state of the host OS 530 as heartbeat information without transmitting a guest OS state/application state (S805).

On the other hand, if there are failures in the guest OS's 130 and 230 or the applications 110 and 210, to execute failover, states of the guest OS and the application are set as heartbeat information in addition to a state of the host OS (S804). In a step S806, pieces of information designated in the steps S804 and S805 are transmitted as heartbeats en bloc to the master cluster program 520' of the standby system (S806, notification T33). The notification T33 contains pieces of information shown in FIG. 19.

In FIG. 19, the notification T33 contains host OS information constituted of an identifier 6001 of a host OS, a state (active system (ONL) and standby system (SBY)) 6002 of a host OS 530, and time 6003 of updating the state of the host OS 530, failed guest OS information constituted of an identifier 6101 of a failed guest OS and time 6103 of updating the state of the guest OS, and failed application information constituted of identifiers 6111 of failed applications 110 and 210, an operation states 6112 (statuses NG or OK) of the applications, and time 6113 of updating the operation states of the applications.

Those pieces of information 6001 to 6113 constituting the notification T33 correspond to the pieces of information 5001 to 5003, 5101, 5103, and 5111 to 5113 of the third embodiment shown in FIG. 15. In the notification T33, if the master cluster program 520 executes the step S804 (when there is a failure in the guest OS or the application), pieces of information including those 6001 to 6113 are set as a lump of heartbeats. On the other hand, if the master cluster program 520 does not execute the step S804 (there is no failure in the guest OS or the application), only the pieces of information 6001 to 6003 are transmitted as heartbeats. If the application operation state 6112 notifies only presence or absence of an application failure, it is not necessary to transmit the information 6112 through the notification T33 as it is included in information notified by the failed application identifier 6111.

Next, the master cluster program 520' of the standby system that receives the notification T33 executes processing 8B, and steps S841 to S848 executed in the processing 8B are similar to the steps S641 to S648 of the third embodiment shown in FIG. 14.

Differences of the fifth embodiment of FIG. 18 from the third embodiment of FIG. 14 will be described below. First, the step S845 is executed when the host OS 530 of the active system is normal. Accordingly, as the guest OS/application state of the active system is normal, in the step S845, judging that states of the guest OS's 130 and 230 of the host OS 350 and states of applications 110 and 210 operated in the guest OS's are normal in addition to a state of the host OS 350 included in the notification T33, a host OS state management table 525, a guest OS state management table 513, and an application state management table 527 are updated.

In the step S848, failover is executed as in the case of the step S348 and the notification T14, and notification is carried out to instruct failover to the slave cluster programs 120' and 220' of the standby system (notification T34).

Steps S861 and S863 of processing 3D executed by the slave cluster programs 120' and 220' of the standby system for receiving the notification T34 are similar to the steps S361 and S363 of the first embodiment shown in FIG. 9.

According to the fifth embodiment, the master cluster program 520 of the active system can monitor failures of the guest OS's 130 and 230 and the application of the active system. During normal operations of the guest OS and the application, only a state of the host OS is transmitted as a heartbeat between the host OS's, and failover can be realized only by notifying a state of the guest OS/application only when failures occur in the guest OS and the application. Thus, by making unnecessary failure monitoring based on heartbeats between the slave cluster programs other than when a failure occurs, the amount of heartbeats can be reduced without depending on the number of guest OS's, and a failover method of realizing a hot standby system can be realized.

Sixth Embodiment

Figure 21:
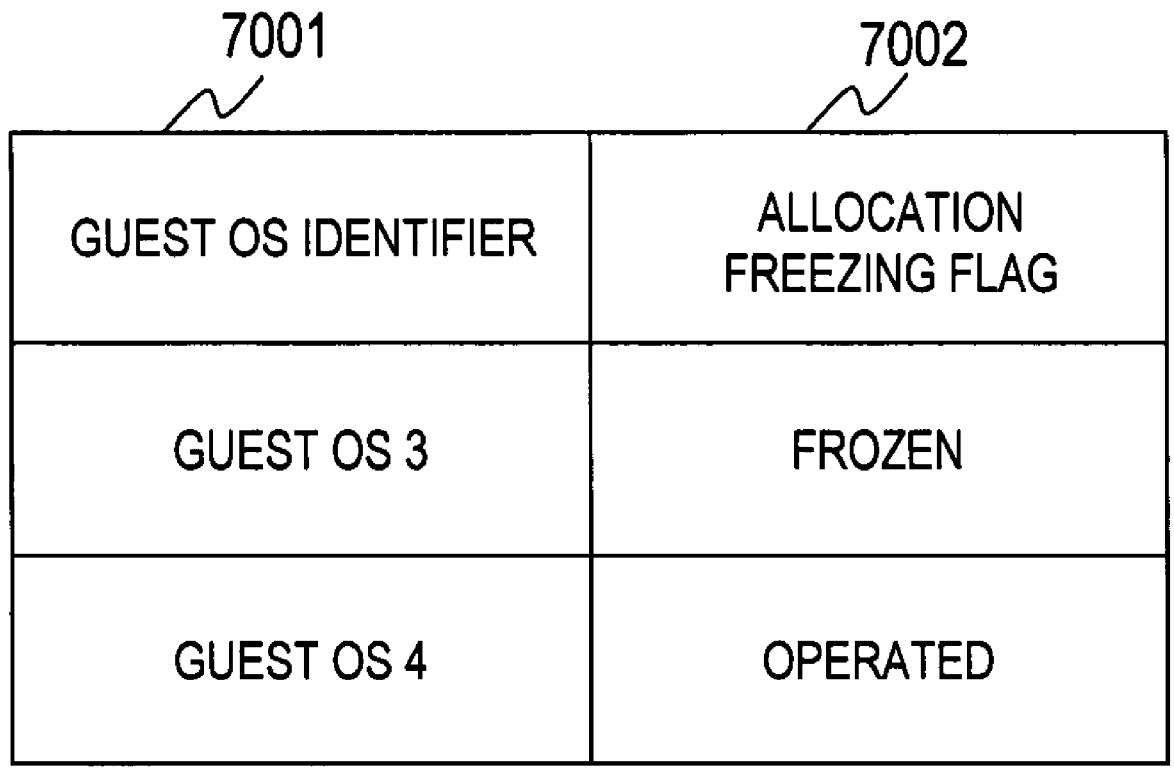
FIG. 21 is a configuration diagram showing a CPU allocation table according to the sixth embodiment.
Figure 22:
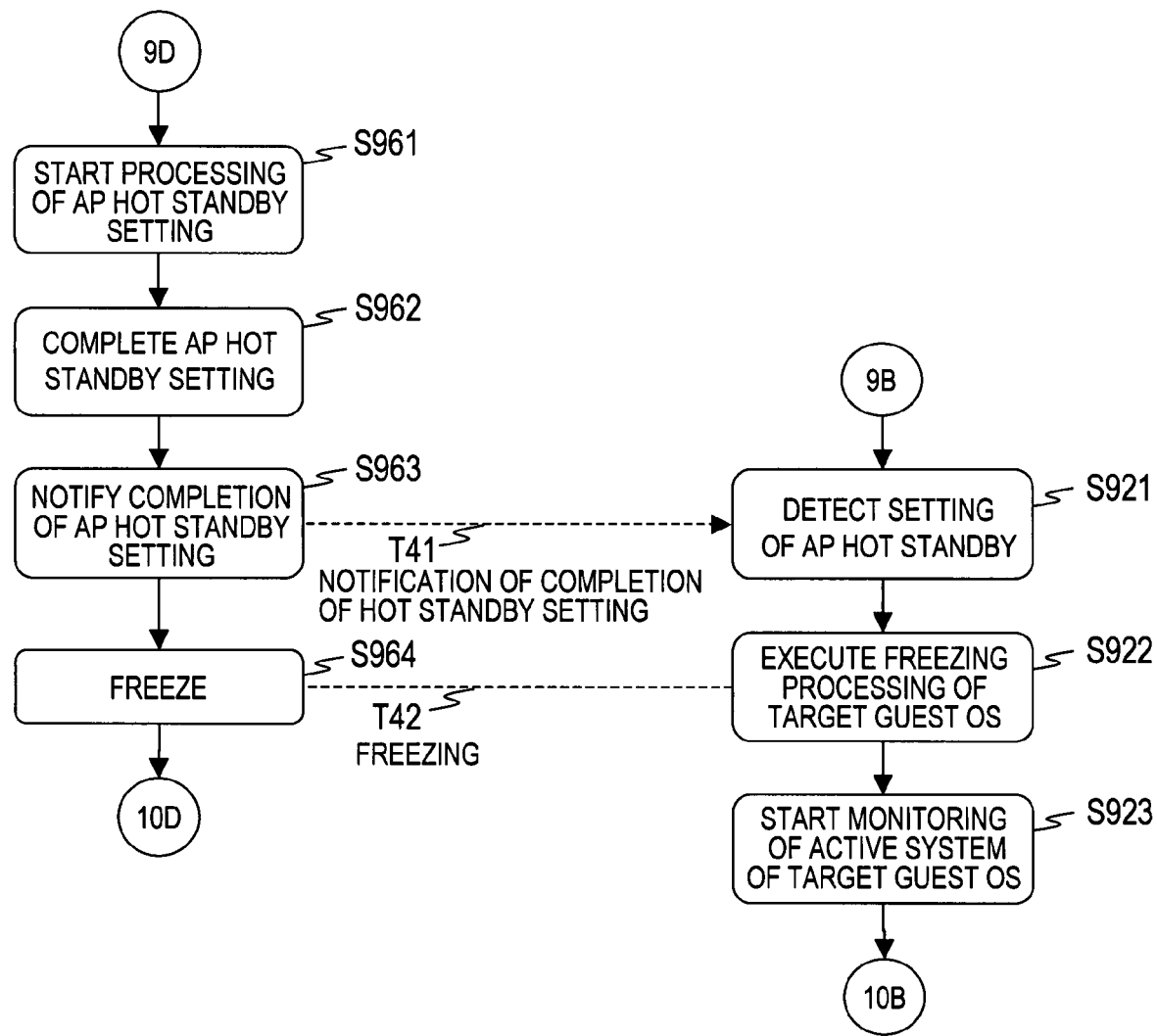
FIG. 22 is a flowchart showing an example of freezing processing of a standby system guest OS according to the sixth embodiment.
Figure 23:
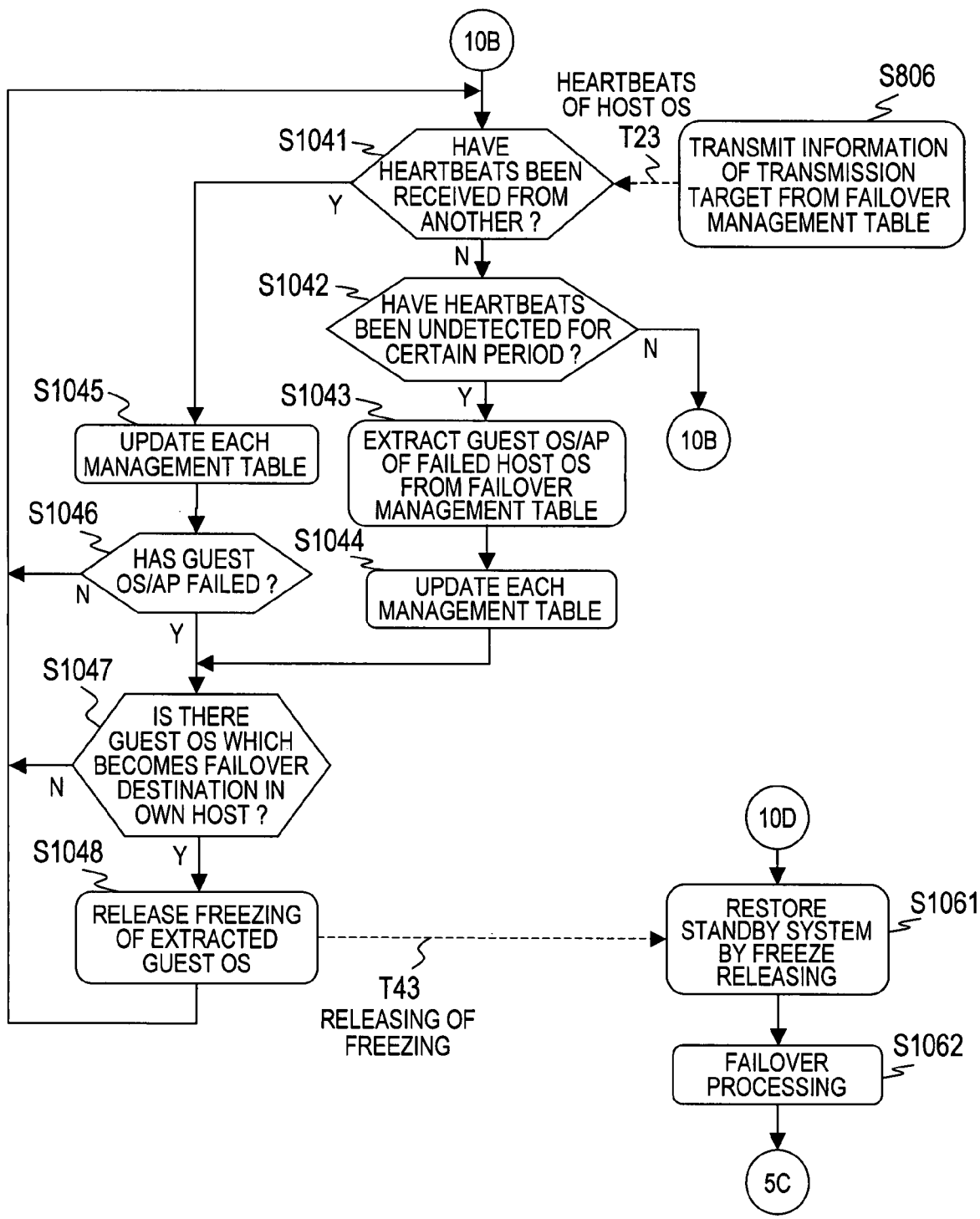
FIG. 23 is a flowchart showing an example of failover processing to the standby system guest OS according to the sixth embodiment.

FIGS. 20 to 23 show a sixth embodiment in which a CPU scheduler unit 514 and a CPU allocation table 515 are provided for managing allocation of CPU'S which execute guest OS's, and the processing of the fifth embodiment shown in FIG. 18 is substituted with processing of FIG. 23.

Figure 20:
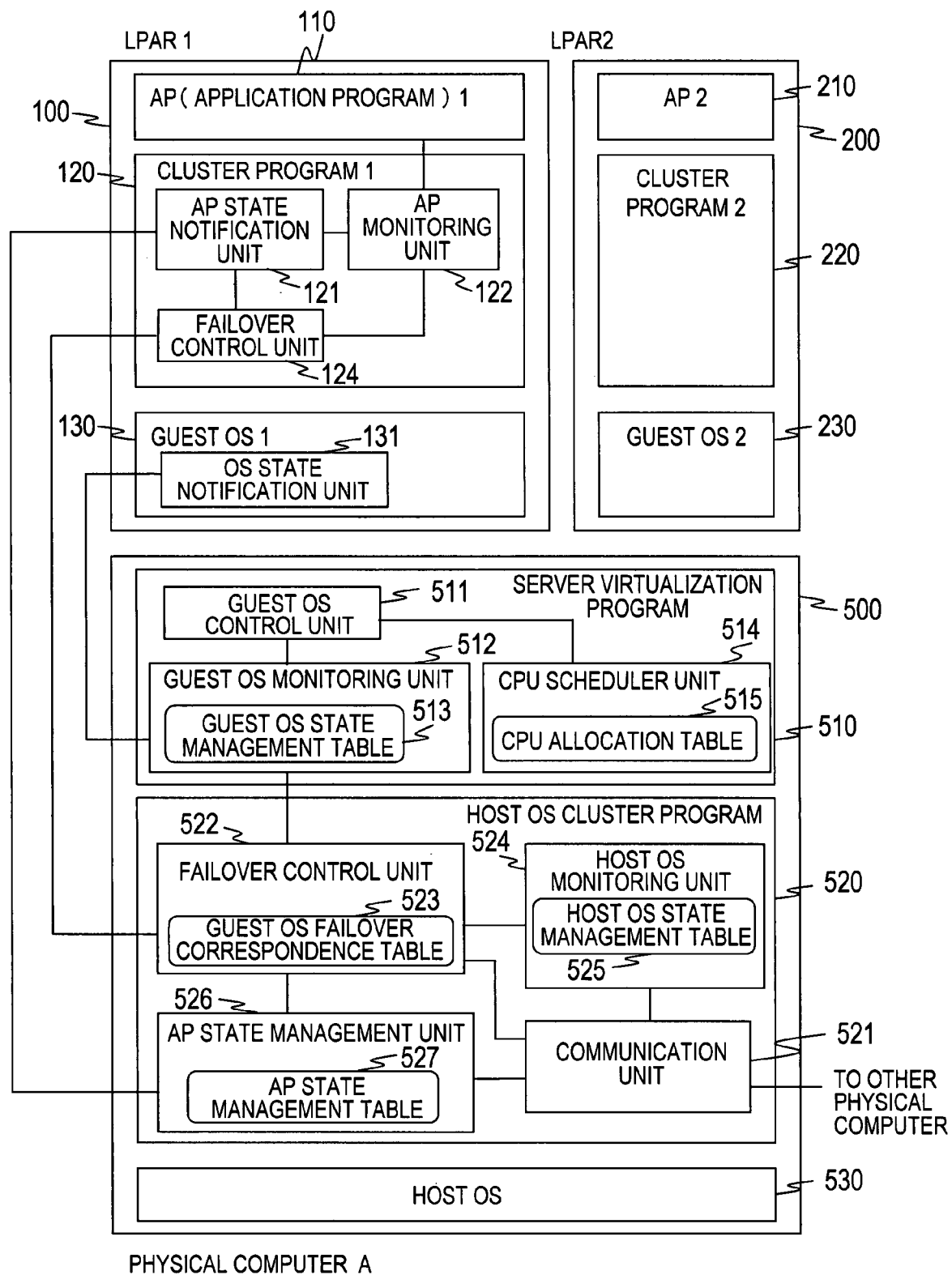
FIG. 20 is a block diagram showing a detailed configuration of software executed by an active system physical computer according to a sixth embodiment.

FIG. 20 is a functional block diagram of a physical computer A of an active system according to the sixth embodiment. A physical computer B of a standby system is configured as in the case of FIG. 20, and thus illustration thereof is omitted.

In FIG. 20, in the physical computer A, in addition to those of the fifth embodiment shown in FIG. 17, the server virtualization program 510 includes a CPU scheduler unit 514 for allocating a CPU to each guest OS, and a CPU allocation table 515 for managing its allocation state.

As shown in FIG. 21, the CPU allocation table 515 contains an identifier 7001 of a guest OS which becomes a CPU allocation target, and an allocation freezing flag 7002 for indicating a stoppage/nonstoppage of allocation. If the flag 7002 is set to "frozen", the CPU scheduler section 514 does not allocate a CPU to the guest OS, and thus the guest OS is set in a frozen (temporarily stopped) state. On the other hand, if the allocation freezing flag is "operated", the server virtualization program 510 allocates a CPU to a guest OS of the guest OS identifier 7001 to execute the CPU.

FIG. 22 is a flowchart showing processing of freezing the guest OS's 130' and 230' of the standby system of the sixth embodiment.

First, the slave cluster program 120' (220') of the standby system sets an application in a hot standby state so that failover by a hot standby system can be realized (S961). After the application has been set in the hot standby state (S962), completion of setting the application in the hot standby state is notified to the master cluster program 520' of the standby system (S963, notification T41).

Upon reception of the notification T41, the master cluster program 520' of the standby system sets the allocation freezing flag of the CPU allocation table 515 to "frozen" to stop allocation of the CPU to the notified guest OS of the standby state (S922). Accordingly, CPU allocation to the guest OS of the standby system always becomes 0% (frozen) (S964, freezing processing T42). After the freezing, the master/slave cluster program of the standby system executes processing (10B, 10D, and after) which is failover processing by freeze releasing. As the guest OS is frozen, the cluster program 120' (220') of the guest OS is also frozen.

FIG. 23 is a flowchart showing processing of failover to the guest OS of the standby system according to the sixth embodiment.

Steps S1041 to S1047 of the processing 10B are similar to the steps S841 to S847 of the fifth embodiment shown in FIG. 18. In a step S1048, a failure has occurred in one of the host OS, the guest OS, and the application, and failover is necessarily performed. Accordingly, by releasing (updating to operation) the allocation freezing flag of the CPU allocation table 515, freezing of the guest OS of the standby system which becomes a failover destination is executed. Thus, the operation of the guest OS of the standby system is started again (freeze releasing processing T43), and the slave cluster program 120' (220') is operated again as the standby system (S1061). Since the reoperation of the slave cluster program 120' (220') indicates that a failure has occurred in the active system, the slave cluster program executes failover (S1062).

As shown in FIGS. 20 to 23, according to the sixth embodiment, consumption of computer resources such as a CPU conventionally used by the guest OS of the standby system operated in the own computer and consumption of resources of the host OS 530' can be stopped and, when a failure occurs in the active system, failover can be realized by operating the guest OS of the standby system again. Thus, when the active system is normal, by stopping allocation of computer resources to the standby system, even if the number of guest OS's of a standby system is increased, it is possible to realize a failover method based on a hot standby system in which no drop occurs in performance, and solve the second and third problems. Further, it is possible to reduce running costs by reducing power consumption of the standby system and suppressing heat generation.

Seventh Embodiment

Figure 26:
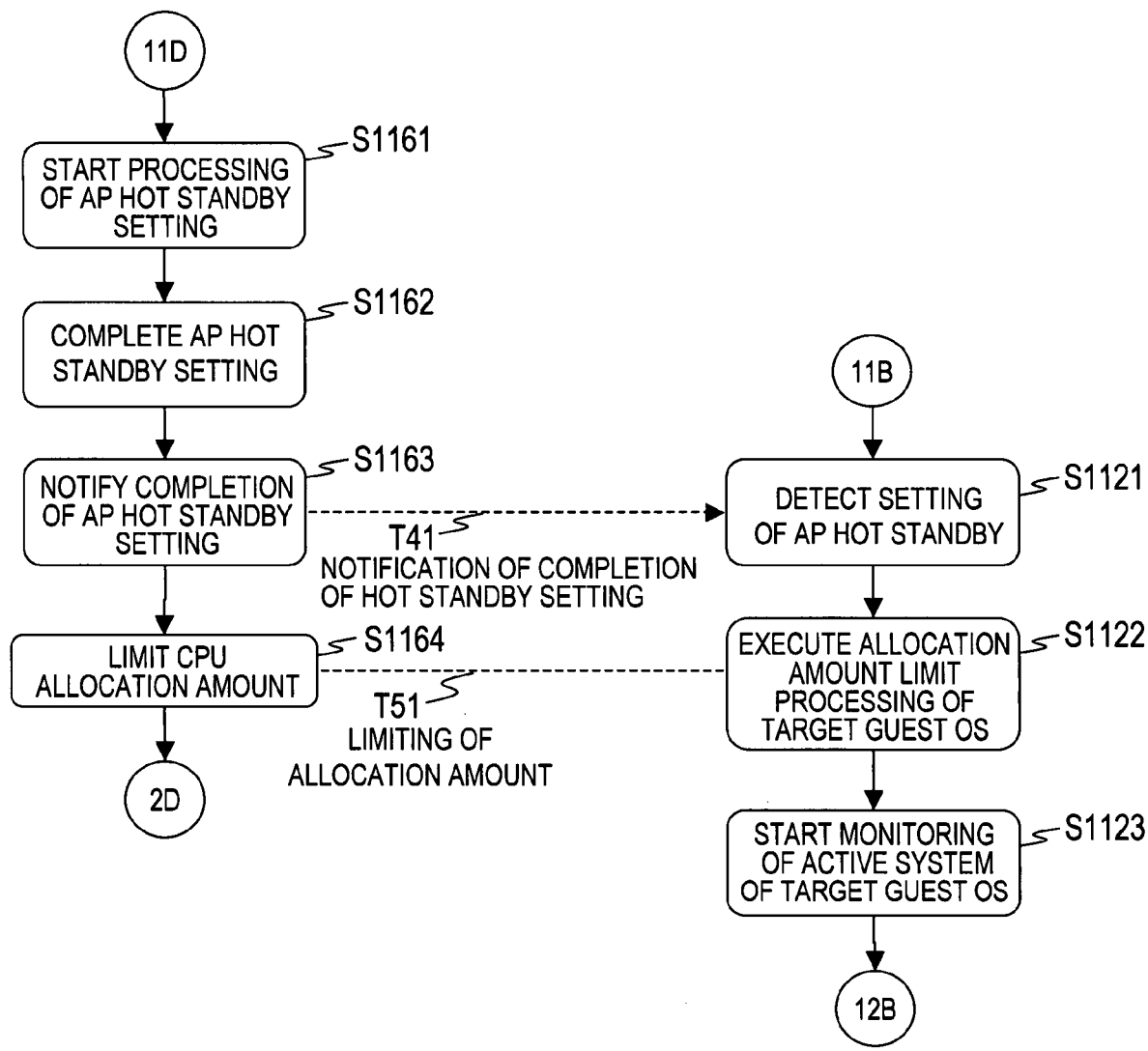
FIG. 26 is a flowchart showing processing of limiting a CPU allocation amount to a standby guest OS according to the seventh embodiment.
Figure 27:
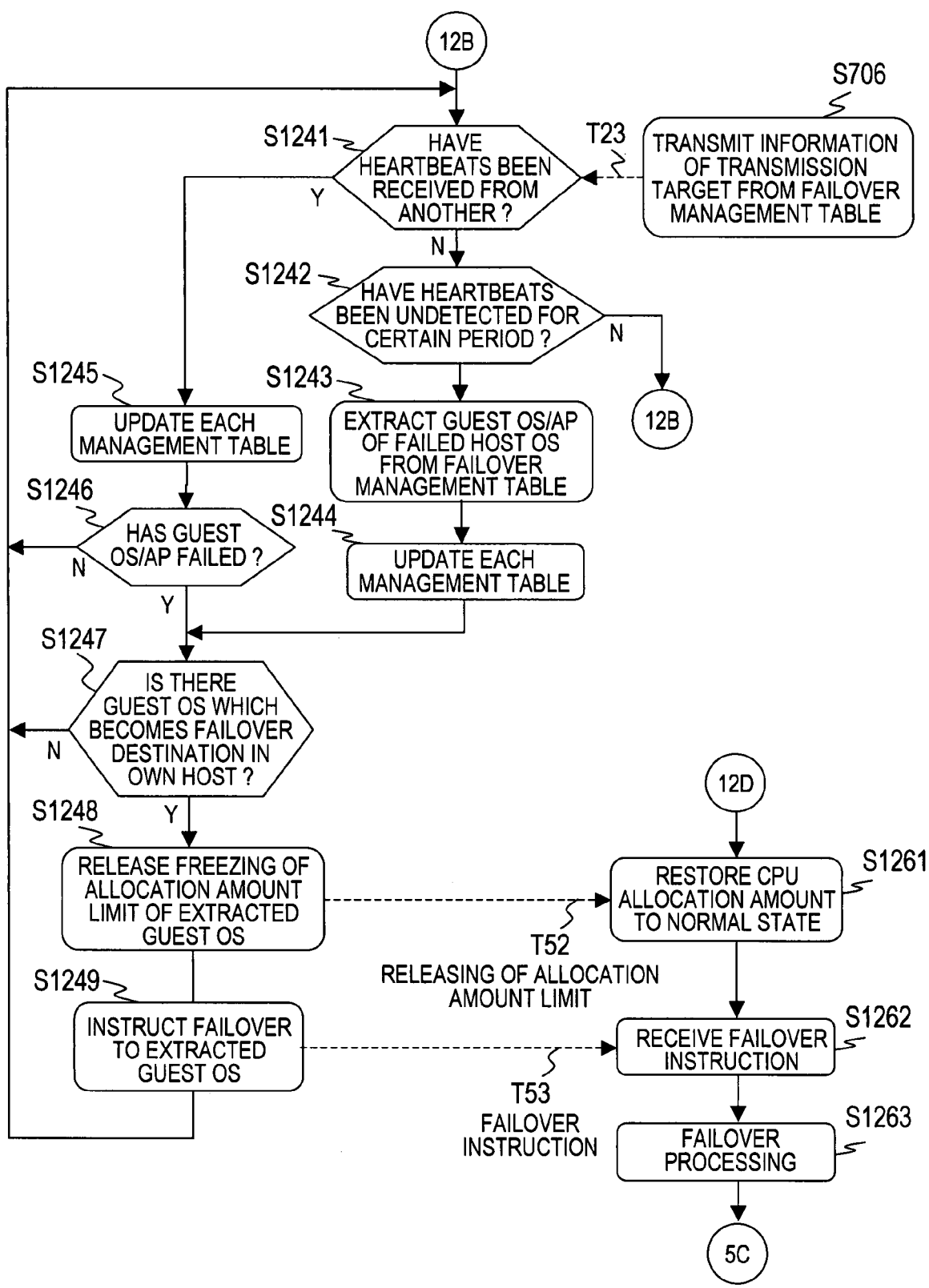
FIG. 27 is a flowchart showing an example of failover processing executed by a standby maser cluster program according to the seventh embodiment.

FIGS. 24 to 28 show a seventh embodiment in which the CPU scheduler unit 514 and the CPU allocation table 516 for managing allocation of the CPU executed by the guest OS of the sixth embodiment are applied to the first embodiment, and the processing of the first embodiment shown in FIG. 9 is substituted with processing of FIG. 27.

Figure 24:
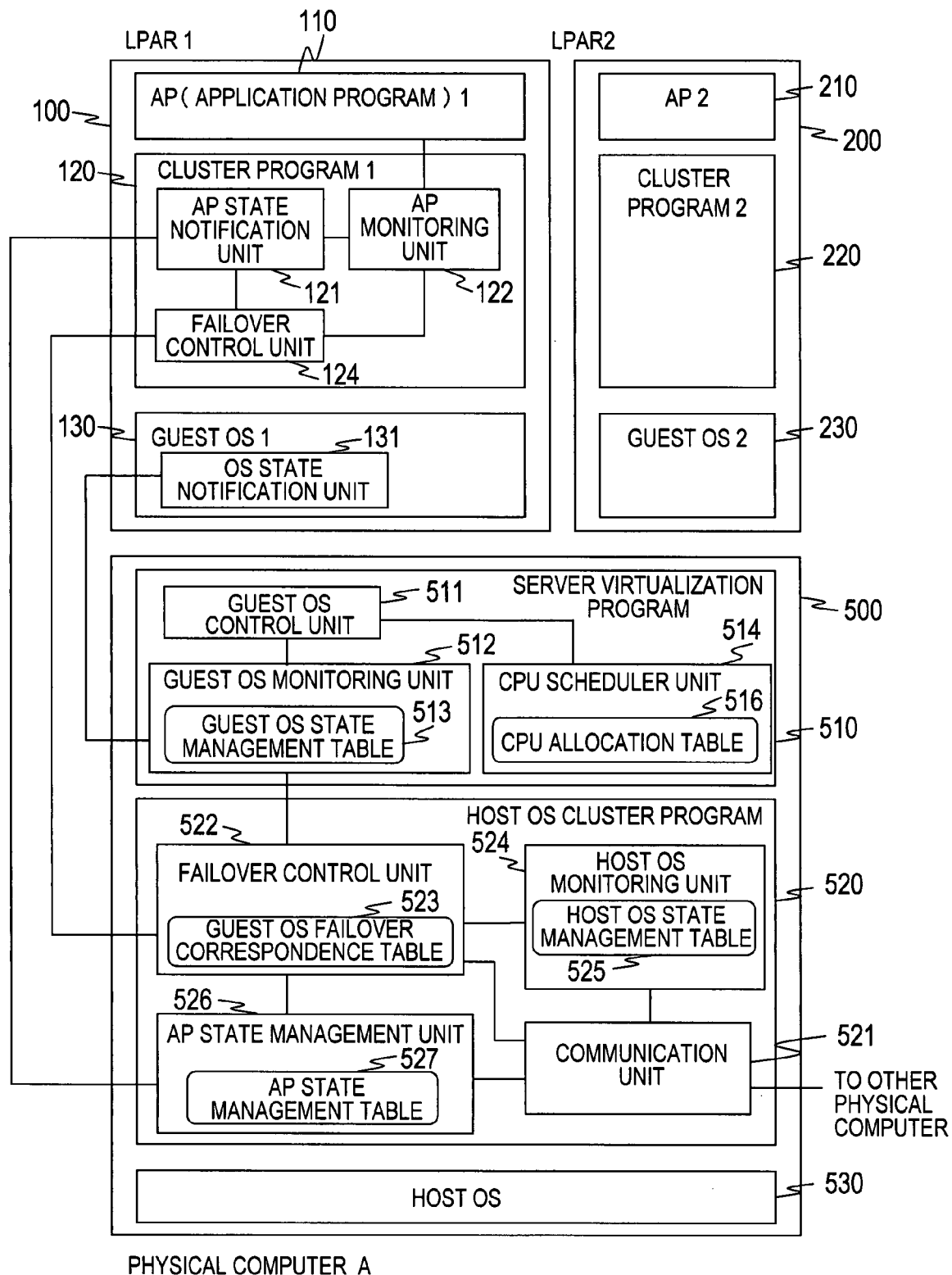
FIG. 24 is a block diagram showing a detailed configuration of software executed by an active system physical computer according to a seventh embodiment.

FIG. 24 is a functional block diagram of a physical computer A of an active system according to the seventh embodiment. A physical computer B of a standby system is configured as in the case of FIG. 24, and thus illustration thereof is omitted.

In FIG. 24, the physical computer A, as in the case of the sixth embodiment shown in FIG. 20, the server virtualization program 510 includes a CPU scheduler unit 514, and a CPU allocation table 516 for managing its allocation state. The CPU allocation table 516 includes, as shown in FIG. 25, an identifier 8001 of a guest OS which becomes a CPU allocation destination, and a flag (allocation limit flag) 8002 indicating whether or not to reduce the amount of allocation. When the flag 8002 is set (allocation limit), the CPU scheduler unit 514 reduces CPU allocation to the guest OS. In this case, the reduction method of the CPU allocation may be a method which does not execute allocation at a certain rate, or a method which does not execute allocation at a certain rate according to a load amount of the target gust OS, e.g., when a load amount is small. Additionally, a method of switching a CPU operation mode to failover to, e.g., a power saving mode, may be employed.

FIG. 26 is a flowchart indicating processing of limiting CPU allocation amounts to the guest OS's 130' and 230' of the standby system according to the seventh embodiment.

Steps S1161 to S1163 and S1121 of FIG. 26 are similar to the steps S961 to S963 and S921 of the sixth embodiment shown in FIG. 22. In the step S1121, upon reception of the notification T41, the master cluster program 520' of the standby system sets an allocation reduction flag of the CPU allocation table 516 to "allocation limited" to reduce CPU allocation amounts with respect to the notified guest OS's 130' and 230' of the standby system (S1122), and a CPU allocation amount is limited for the guest OS of the standby system (S1164, allocation amount limit processing T52). Accordingly, since monitoring of heartbeats between the slave cluster programs is executed as in the case of the first embodiment while operation rates of the slave cluster programs 120' and 220' of the standby system are reduced, failure monitoring processing (2D) and thereafter are carried out after completion of the step S1164. The master cluster program 520' of the standby system executes processing 2B described below and after.

FIG. 27 is a flowchart showing processing of failover to the guest OS's 130' and 230' of the standby system when the master cluster program 520' of the standby system detects a failure of the active system according to the seventh embodiment.

In FIG. 27, steps S1241 to S1247 are similar to the steps S1041 to S1047 of the sixth embodiment shown in FIG. 23. In a step S1248, a failure has occurred in one of the host OS, the guest OS, and the application, which necessitates failover. Thus, the master cluster program 520' of the standby system releases the allocation limit flag of the CPU allocation table 516 to release the allocation amount limits of the guest OS's 130' and 230' of the standby system (S1248; allocation amount limit release processing T52). Accordingly, the guest OS's 130' and 230' of the standby system resume operations in the state before the allocation amount limit processing S1164 (S1261). After the step S1248, the master cluster program 520' instructs failover to the slave cluster program 120' (220') (S1249, notification T53). Upon reception of the notification T53 from the master cluster program 520' in the step S1262, the slave cluster program 120' executes failover (S1263).

Thus, in the limited state of the CPU allocation amount of the standby system, when the master cluster program 520' detects a failure, it is possible to carry out failover by restoring the CPU allocation amount of the standby system.

Figure 28:
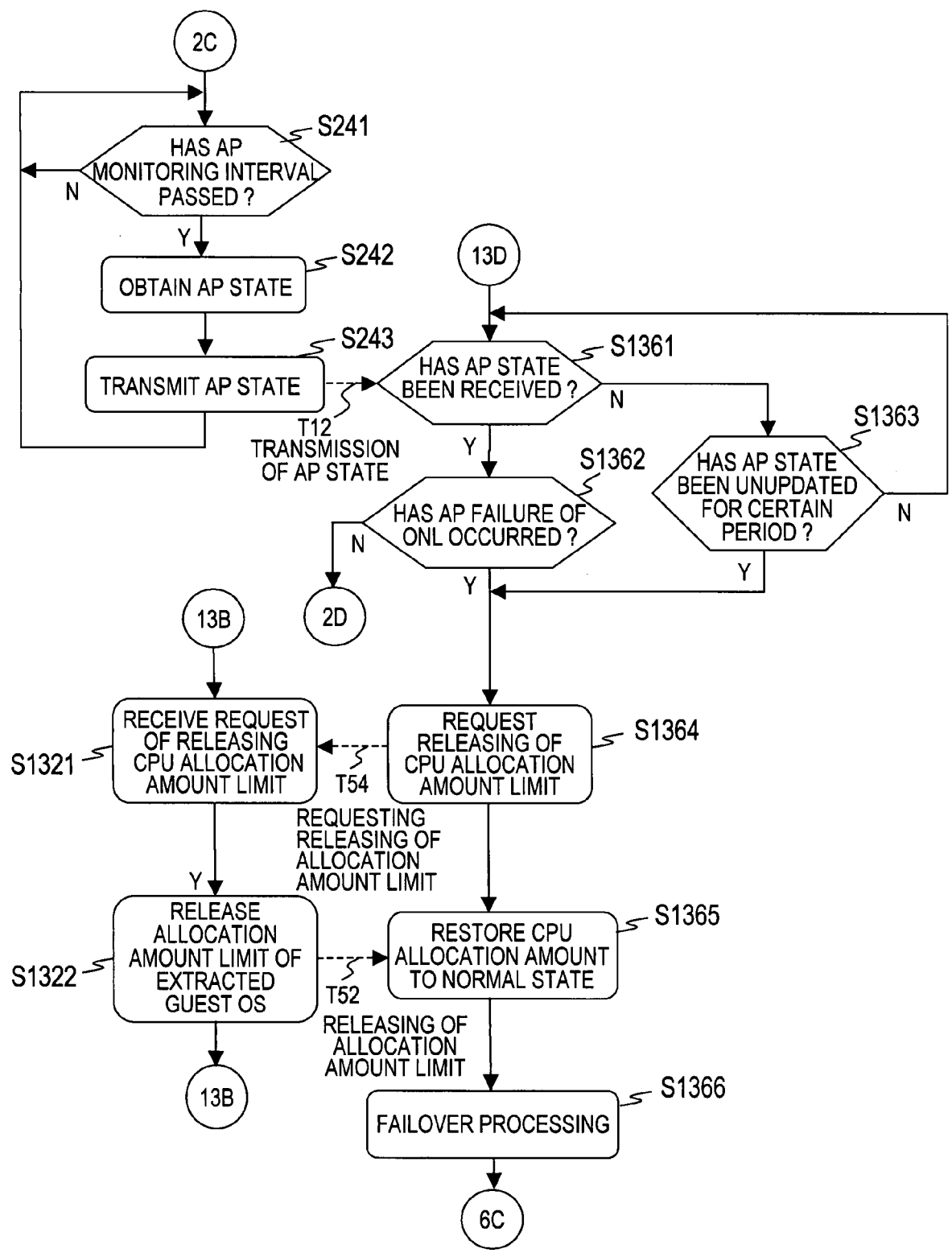
FIG. 28 is a flowchart showing an example of failover processing of a standby system slave cluster program according to the seventh embodiment.

FIG. 28 is a flowchart showing failover processing to the guest OS of the standby system when the slave cluster program 120' (220') of the standby system detects a failure of the active system according to the seventh embodiment.

Steps S1361 to S1363 are similar to the steps S261 to S264 of the first embodiment shown in FIG. 8. Then, in a step S1364, the slave cluster program 120' of the standby system has detected an application failure of the active system, thereby making a CPU allocation limit releasing request to the master cluster program 520' of the standby system to release the CPU allocation amount limitation executed in the step S1164 to execute the failover (S1364, notification T54).

Upon reception of the notification T54 (step S1321), as in the case of the step S1248 of FIG. 27, the master cluster program 520' of the standby system releases the allocation amount limit flag of the CPU allocation table 516 to release the CPU allocation amount limit of the guest OS of the standby system (S1322). Accordingly, as in the case of the step S1261, after operations of the guest OS's 130' and 230' are started with the CPU allocation amount set in a state before the step S1164 (step S1365), the slave cluster programs 120' and 220' of the standby system are executed (step S1366).

Accordingly, in the limited state of the CPU allocation amount of the standby system, even when the slave cluster program 120' and 220' of the standby system detect failures, it is possible to realize failover by restoring the state where the CPU allocation amount limit of the standby system is released.

The example of limiting the CPU allocation amount to the application or the guest OS of the standby system is described. However, by reducing a memory or I/O allocation amount, it is possible to effectively use the computer resources of the standby system for other processings.

As shown in FIGS. 24 to 28, according to the seventh embodiment in which the sixth embodiment is applied to the first embodiment, it is possible to limit consumption of the computer resources such as the CPU or OS resources by the guest OS of the standby system operated in the own computer, and to realize failover by releasing the CPU allocation limit of the guest OS of the standby system and instructing the guest OS of the standby system when a failure occurs. Thus, when the active system is normal, by limiting the computer resources to the standby system, even if the number of guest OS's of the standby system is increased, it is possible to realize a failover method based on a hot standby system which suppresses a drop in performance.

Figure 29:
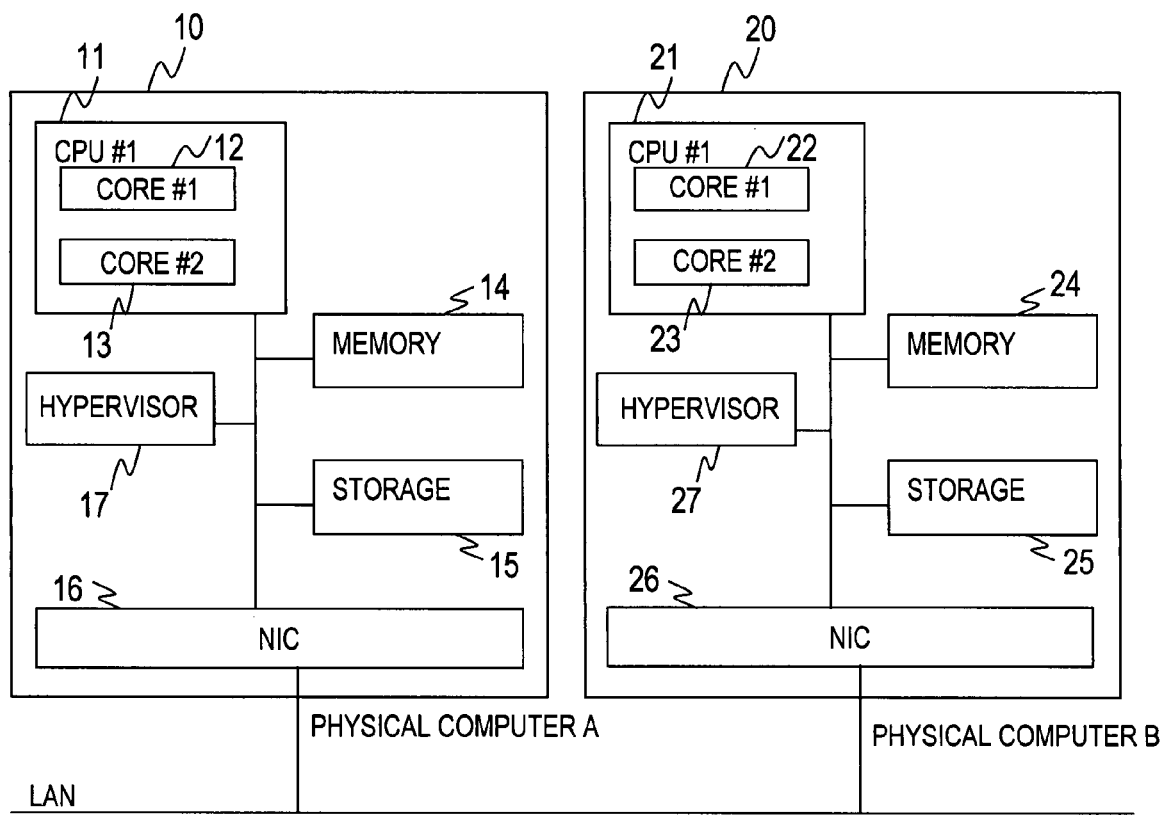
FIG. 29 is a block diagram showing another embodiment of a hardware configuration of physical computers.
Figure 30:
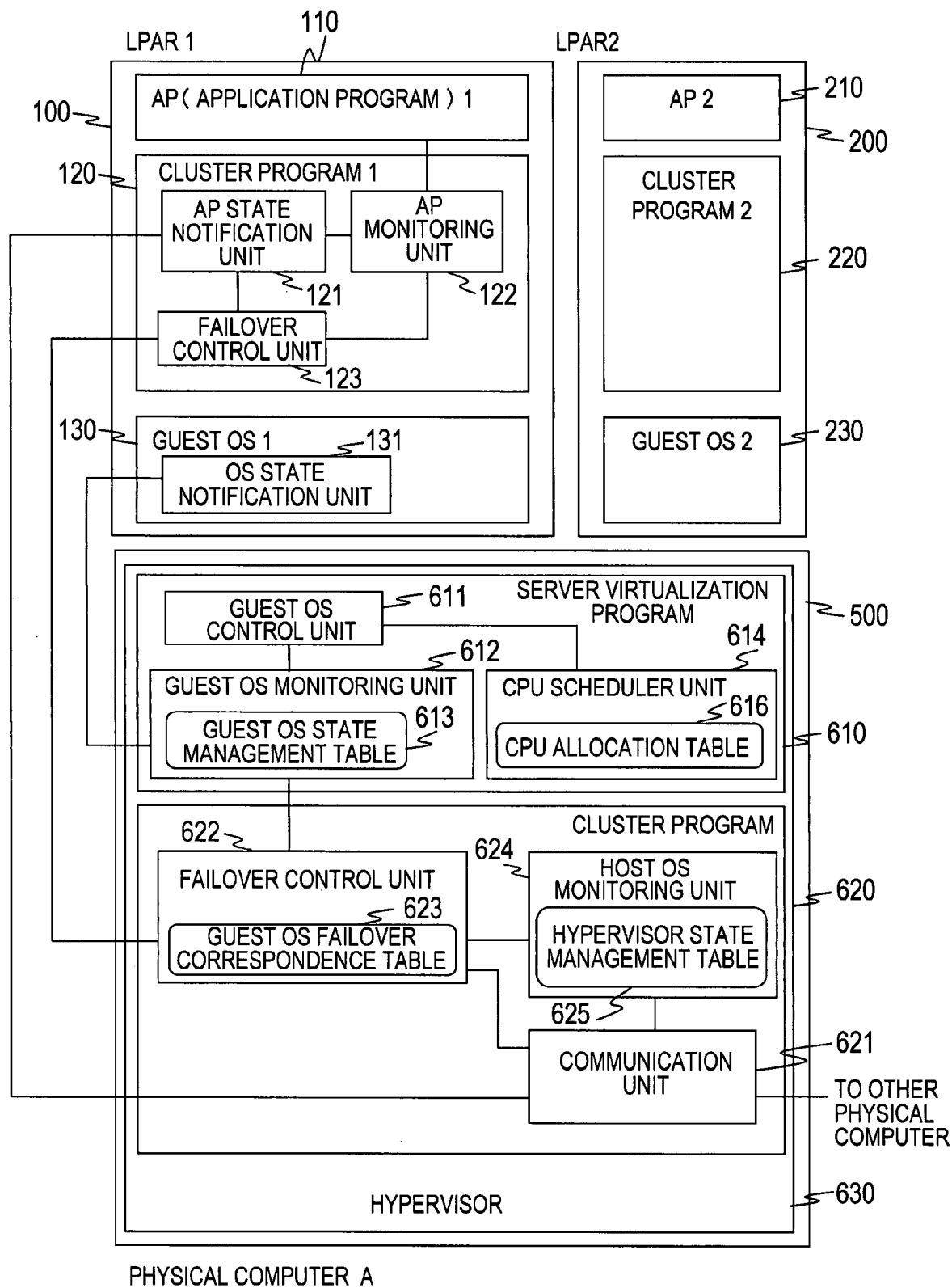
FIG. 30 is a functional block diagram of software showing another server virtualization environment.
Figure 31:
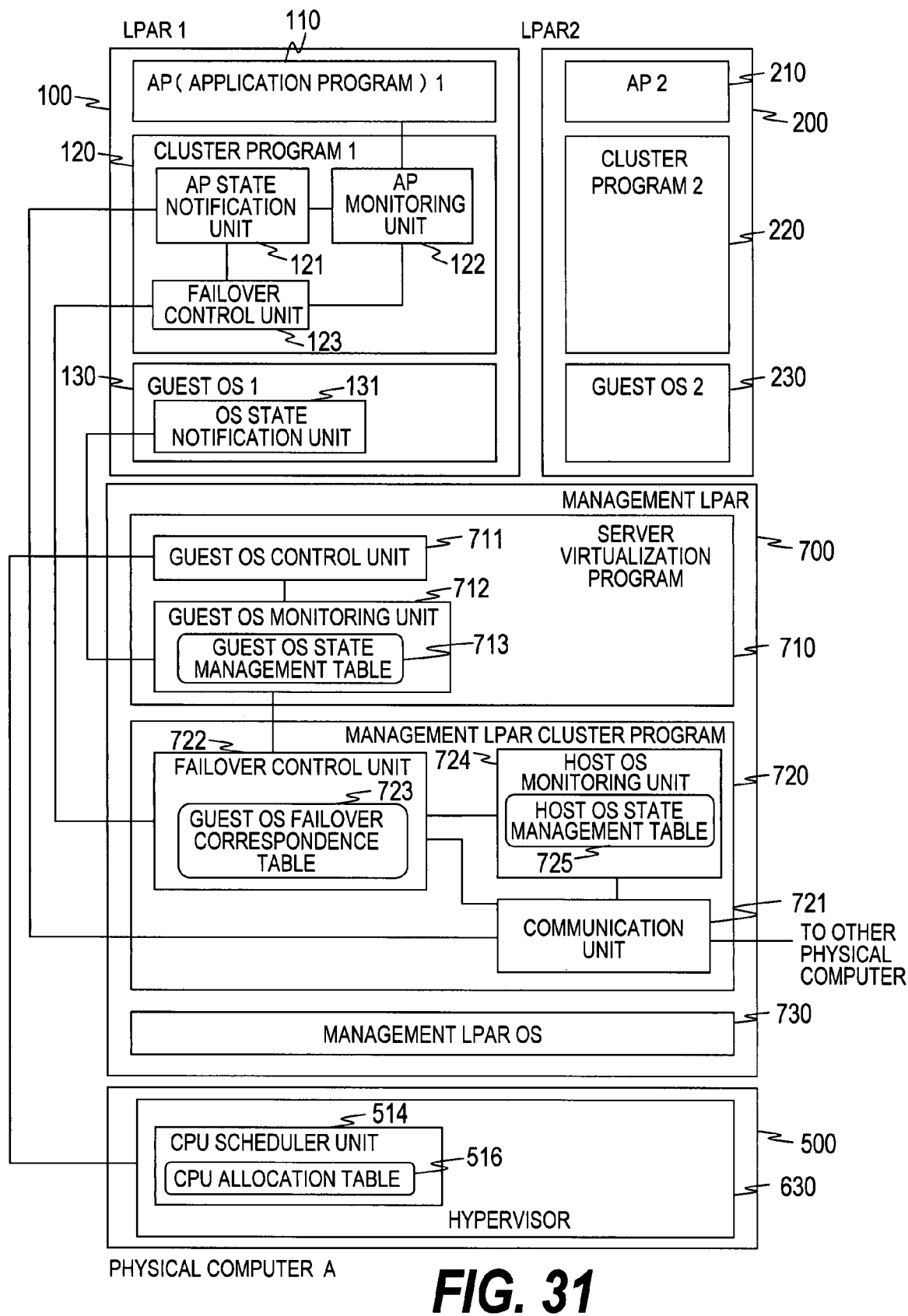
FIG. 31 is a functional block diagram of software showing still another server virtualization environment.

This invention is described by way of embodiments in which the server virtualization mechanism (server virtualization program) is present in the host OS. However, as described in the background art of this invention, the server virtualization mechanisms may be present in hypervisors 17, 27, and the like as shown in a hardware configuration diagram of FIG. 29. For example, as shown in a functional block diagram of a server virtualization environment of FIG. 30, by substituting a hypervisor 630 or the like for the host OS and applying a similar method, similar effects can be obtained. Further, FIG. 31 shows an example in which all the host OS's are substituted with hypervisors 630. However, a configuration in which only some functions are moved to the hypervisor 630 may be employed. For example, as shown in FIG. 31, a sever virtualization program 710 and a master cluster program 720 may be present not in the host OS but in a management LPAR 700 which is LPAR similar to the other guest OS, and a CPU scheduler unit 514 may be present in the hypervisor 630. In this case, similar effects can be obtained by applying a similar method.

According to each of the embodiments, the virtualization unit for providing the plurality of guest OS's employs a configuration which includes a host OA and a server virtualization program, a hypervisor and a virtualization program, or a management OS and a server virtualization program. However, this invention is not limited to those examples. For example, this invention can be applied to a configuration of executing clustering in a configuration in which a plurality of virtual machines are set in a virtual machine monitor and a guest OS is operated in each virtual machine or a configuration in which physical partitions (PPAR) are set by firmware and a guest OS is operated in each PPAR. In the case of using the PPAR, it is only necessary to set a PPAR for a guest OS and a PPAR for a master cluster program.

As apparent from the foregoing, this invention can be applied to the virtualized server environment which employs a cluster configuration. Especially, this invention can be suitably applied to a system required of quick recovery even when a failure occurs.

While the present invention has been described in detail and pictorially in the accompanying drawings, the present invention is not limited to such detail but covers various obvious modifications and equivalent arrangements, which fall within the purview of the appended claims.

What is claimed is:

1. A failover method for a cluster system,
the cluster system comprising:
    first and second virtualization units operated in at least one physical computer;
    a first system including a guest OS operated in the first virtualization unit and an application operated in the guest OS;
    a second system including a guest OS operated in the second virtualization unit and an application operated in the guest OS; and
    a third system capable of starting a new operation when the first system is switched in the second virtualization unit, wherein the cluster system for failing over one of the guest OS and the application between the first system and one of the second system and the third system executes:
        a first cluster processing operated in each guest OS of monitoring the application in the guest OS and failing over the application between the first system and the second system when a failure occurs; and
        a second cluster processing operated in each virtualization unit of monitoring the guest OS operated in the virtualization unit and the other virtualization unit, migrating the guest OS and the application of the first system to the third system when a failure occurs, and starting the guest OS and the application to be failed over between the first system and the third system, the failover method for the cluster system comprising the steps of:
    monitoring one of the guest OS of the first system and the first virtualization unit to detect a failure in the second cluster processing;
    judging the first cluster processing in the failure-detected guest OS when the failure is detected in the second cluster processing;
    instructing failover to the judged first cluster processing in the second cluster processing;
    monitoring a failure of the application in the guest OS in the first cluster processing;
    failing over the application between the first and second systems when a failure of the application is detected in the first cluster processing;
    failing over the application and the guest OS between the first and second systems when the failover instruction is obtained in the first cluster processing from the second cluster processing.

2. The failover method for the cluster system according to claim 1, wherein the step of monitoring a failure of the application in the guest OS in the first cluster processing includes the steps of:
    obtaining information of the application of the guest OS for executing the first cluster processing in the first cluster processing of the first system;
    notifying the obtained information of the application to the second cluster processing of the first virtualization unit in the first cluster processing of the first system;
    obtaining information of the application from the first cluster processing in the second cluster processing;
    notifying the pieces of information of the application received from the first cluster processing of each guest OS en bloc to the second cluster processing of the second virtualization unit in the second cluster processing of the first virtualization unit;
    notifying the information of the application received from the first system to the first cluster processing of the guest OS corresponding to the application in the second cluster processing of the second virtualization unit;
    monitoring a failure of the application based on the information of the application of the first system obtained from the second cluster processing of the second system in the first cluster processing of the second system.

3. The failover method for the cluster system according to claim 2, wherein:
    the information of the application includes an operation state of the application; and
    the step of notifying the obtained information of the application to the second cluster processing of the first virtualization unit in the first cluster processing of the first system includes notifying the operation state of the application to the second cluster processing.

4. A failover method for a cluster system,
the cluster system comprising:
    first and second virtualization units operated in at least one physical computer;
    a first system including a guest OS operated in the first virtualization unit and an application operated in the guest OS;
    a second system including a guest OS operated in the second virtualization unit and an application operated in the guest OS; and
    a third system capable of starting an optional guest OS and an optional application in the second virtualization unit, wherein the cluster system for failing over one of the guest OS and the application between the first system and one of the second system and the third system executes:
        a first cluster processing operated in each guest OS of monitoring the application in the guest OS and failing over the application between the first system and the second system when a failure occurs; and
        a second cluster processing operated in each virtualization unit of monitoring the guest OS operated in the virtualization unit and the other virtualization unit, migrating the guest OS and the application of the first system to the third system when a failure occurs, and starting the guest OS and the application to be failed over between the first system and the third system, the failover method for the cluster system comprising the steps of:
    obtaining information of an application of a guest OS for executing the first cluster processing in the first cluster processing;
    notifying the obtained information of the application to the second cluster processing in the first cluster processing of the first system;
    obtaining the information of the application from the first cluster processing in the second cluster processing of the first virtualization unit;

collecting the pieces of information obtained from the first cluster processings of the guest OS's in the second cluster processing of the first virtualization unit;

notifying the collected pieces of information of the application en bloc to the second cluster processing of the second virtualization unit in the second cluster processing of the first virtualization unit;

obtaining the pieces of information of the application as heartbeats to transmit the heartbeats to the first cluster processing of the guest OS of the second system corresponding to the application in the second cluster processing of the second virtualization unit; and monitoring a failure of the application of the first system based on the information of the application transferred from the second cluster processing, and failing over the application from the first system to the second system when a failure is detected in the first cluster processing of the second system.

5. The failover method for the cluster system according to claim 4, wherein:

the information of the application includes an operation state of the application; and the step of notifying the obtained information of the application to the second cluster processing in the first cluster processing of the first system includes notifying the operation state of the application to the second cluster processing.

6. The failover method for the cluster system according to claim 4, further comprising the steps of:

notifying the collected pieces of information of the application en bloc to the second cluster processing of the second virtualization unit in the second cluster processing of the first virtualization unit;

obtaining a state of the guest OS of the first system in the second cluster processing of the first virtualization unit; and notifying the obtained state of the guest OS and the obtained failed state of the application en bloc to the second cluster processing of the second virtualization unit.

7. A failover method for a cluster system, the cluster system comprising:

first and second virtualization units operated in at least one physical computer;

a first system including a guest OS operated in the first virtualization unit and an application operated in the guest OS;

a second system including a guest OS operated in the second virtualization unit and an application operated in the guest OS; and a third system capable of starting an optional guest OS and an optional application in the second virtualization unit, wherein the cluster system for failing over one of the guest OS and the application between the first system and one of the second system and the third system executes:

a first cluster processing operated in each guest OS of monitoring the application in the guest OS and failing over the application between the first system and the second system when a failure occurs; and a second cluster processing operated in each virtualization unit of monitoring the guest OS operated in the virtualization unit and the other virtualization unit, migrating an optional guest OS and an optional application of the first system to the third system when a failure occurs, and starting the guest OS and the application to be failed over between the first system and the third system, the failover method for the cluster system comprising the steps of:

monitoring an application of a guest OS for executing the first cluster processing in the first cluster processing of the first system;

notifying a state of a failure to the second cluster processing of the first virtualization unit when the failure occurs in the application in the first cluster processing of the first system;

notifying the state of the failure of the application to the second cluster processing of the second virtualization unit only when the state of the failure of the application is obtained in the second cluster processing of the first virtualization unit; and instructing failover to the first cluster processing of the second system when the state of the failure of the application is obtained in the second cluster processing of the second virtualization unit.

8. The failover method for the cluster system according to claim 7, wherein the step of notifying the state of the failure of the application to the second cluster processing of the second virtualization unit only when the state of the failure of the application is obtained in the second cluster processing of the first virtualization unit includes the steps of:

obtaining a state of the guest OS of the first system in the second cluster processing of the first virtualization unit; and notifying the obtained state of the guest OS and the obtained state of the failure of the application en bloc to the second cluster processing of the second virtualization unit.

9. The failover method for the cluster system according to claim 7, wherein the step of notifying the state of the failure of the application to the second cluster processing of the second virtualization unit only when the state of the failure of the application is obtained in the second cluster processing of the first virtualization unit includes adding the state of the failure of the application to heartbeats of the first virtualization unit at a predetermined cycle to notify the state of the failure to the second cluster processing operated in the second virtualization unit.

10. The failover method for the cluster system according to claim 7, further comprising the steps of:

starting the application to stand by in the first cluster processing of the second system;

notifying the standby state of the application to the second cluster management unit of the second virtualization unit in the first cluster processing of the second system;

reducing resources allocated to a guest OS in which the application has been set to stand by to realize the standby state based on the notification in the second cluster processing of the second virtualization unit; and increasing the resources allocated to a guest OS in which the application has been set to stand by to perform failover when the state of the failure of the application is obtained in the second cluster processing of the second virtualization unit.

11. A computer system, comprising:

at least one physical computer;

first and second virtualization units operated in the physical computers;

a first system including a guest OS operated in the first virtualization unit and an application operated in the guest OS;

a second system including a guest OS operated in the second virtualization unit and an application operated in the guest OS;

a third system capable of starting an optional guest OS and an optional application in the second virtualization unit;

a first cluster management unit for monitoring an application of one of the first system and the second system to fail over the application between the first system and the second system when a failure occurs; and a second cluster management unit for monitoring the guest OS of the first system and the first virtualization unit to fail over the guest OS between the first system and the third system when a failure occurs, wherein:

the first cluster management unit includes an application monitoring unit for obtaining information of the application of the guest OS, an application state notification unit for notifying the obtained information of the application to the second cluster management unit, and a failover control unit for failing over the application between the first and second systems when the information of the application contains failure information;

the second cluster management unit includes a communication unit for performing one of notifying the information of the application received from the first cluster management unit to the second cluster management unit of the other virtualization unit and transferring information of an application received from the other system to the first cluster management unit; and the first cluster management unit of the second system monitors the failure of the application based on the information of the application of the first system obtained from the second cluster management unit of the second virtualization unit.

12. The computer system according to claim 11, wherein:
the first cluster management unit is operated in the guest OS of each of the first and second systems;
the second cluster management unit is operated in the virtualization unit of each of the first and second systems;
in the first cluster management unit of the first system, the application state notification unit notifies the information of the application to the second cluster management unit of the first virtualization unit;
in the second cluster management unit of the first virtualization unit, the communication unit notifies the information of the application to the second cluster management unit of the second virtualization unit;
in the second cluster management unit of the second virtualization unit, the communication unit receives the information of the application from the second cluster management unit of the first virtualization unit to notify the information to the first cluster management unit of the second system; and
in the first cluster management unit of the second system, the application monitoring unit monitors the application of the first system, and the failover control unit turns the application of the first system over to the second system when the information of the application contains failure information.

13. The computer system according to claim 11, wherein:
the second cluster management unit includes a failover instruction unit for monitoring the application based on the information of the application, and notifying a failover instruction to the first cluster management unit when a failure occurs in the application;
the first cluster management unit is operated in the guest OS of each of the first and second systems;
the second cluster management unit is operated in the virtualization unit of each of the first and second systems;
in the first cluster management unit of the first system, the application state notification unit notifies the information of the application to the second cluster management unit of the first virtualization unit;
in the second cluster management unit of the first virtualization unit, the communication unit notifies the information of the application to the second cluster management unit of the second virtualization unit;
in the second cluster management unit of the second virtualization unit, the communication unit receives the information of the application from the second cluster management unit of the first virtualization unit, and the failover instruction unit notifies a failover instruction to the first cluster management unit of the second system when the failure information of the application is contained; and
in the first cluster management unit of the second system, the failover control unit turns the application of the first system over to the second system.

14. The computer system according to claim 11, wherein:
each of the first and second virtualization units operates a plurality of guest OS's;
the first cluster management unit notifies the information of the application and information of the guest OS to the second cluster management unit for each application of each guest OS; and
the communication unit of the second cluster management unit collects pieces of the information of the application and the information of the guest OS from the first cluster management unit, and notifies the collected pieces of information to the second cluster management unit of the other virtualization unit.

15. The failover method for the cluster system according to claim 4, further comprising the steps of:
starting the application to stand by in the first cluster processing of the second system;
notifying the standby state of the application to the second cluster management unit of the second virtualization unit in the first cluster processing of the second system;
reducing resources allocated to a guest OS in which the application has been set to stand by to realize the standby state based on the notification in the second cluster processing of the second virtualization unit; and
increasing the resources allocated to a guest OS in which the application has been set to stand by to perform failover when the state of the failure of the application is obtained in the second cluster processing of the second virtualization unit.

* * * * *